(12) United States Patent
Taniguchi et al.

(10) Patent No.: US 10,976,272 B2
(45) Date of Patent: Apr. 13, 2021

(54) X-RAY ANALYSIS ASSISTANCE DEVICE AND X-RAY ANALYSIS DEVICE

(71) Applicant: RIGAKU CORPORATION, Tokyo (JP)

(72) Inventors: Yayoi Taniguchi, Tokyo (JP); Keiichi Morikawa, Tokyo (JP)

(73) Assignee: RIGAKU CORPORATION, Tokyo (JP)

( * ) Notice: Subject to any disclaimer, the term of this patent is extended or adjusted under 35 U.S.C. 154(b) by 4 days.

(21) Appl. No.: 16/498,593

(22) PCT Filed: Jan. 25, 2018

(86) PCT No.: PCT/JP2018/002205
§ 371 (c)(1),
(2) Date: Sep. 27, 2019

(87) PCT Pub. No.: WO2018/179744
PCT Pub. Date: Oct. 4, 2018

(65) Prior Publication Data
US 2020/0191732 A1 Jun. 18, 2020

(30) Foreign Application Priority Data
Mar. 30, 2017 (JP) .............................. JP2017-066694

(51) Int. Cl.
G01N 23/201 (2018.01)
G01N 23/207 (2018.01)
G01N 23/205 (2018.01)
(52) U.S. Cl.
CPC ......... *G01N 23/201* (2013.01); *G01N 23/205* (2013.01); *G01N 23/207* (2013.01)
(58) Field of Classification Search
CPC ........... G01N 23/20008; G01N 23/201; G01N 23/205; G01N 23/207
See application file for complete search history.

(56) References Cited

U.S. PATENT DOCUMENTS 6,069,934 A 5/2000 Verman et al.
9,236,220 B2 1/2016 Tsuno et al.
(Continued)

FOREIGN PATENT DOCUMENTS

EP 1 406 084 A1 4/2004
JP H06-74923 A 3/1994
(Continued)

OTHER PUBLICATIONS

Computer generated English Translation of JP-2009-002805 (A), 36 pages [retrieved on Jul. 3, 2019] Retrieved from https://www.j-platpat.inpit.go.jp/p0200.
(Continued)

*Primary Examiner* — Chih-Cheng Kao
(74) *Attorney, Agent, or Firm* — Westerman, Hattori, Daniels & Adrian, LLP

(57) ABSTRACT

An X-ray analysis assistance device with an input and operation device 24 for arbitrarily inputting and setting the value of one from among the distance L between a sample S and a two-dimensional detector 2 and the maximum detection range Xmax for X-rays scattered or diffracted by the sample S, and a central processing unit 20 for automatically setting the other setting item on the basis of the value of the one setting item set by the input and operation device 24. Further, the maximum measurement frame Hmax for the X-rays is displayed on a display screen 22 of a display device 21 on the basis of the distance L and maximum detection range Xmax. Additionally, an X-ray detection area A indicating the range within which it is possible for the detection surface of the two-dimensional detector 2 to detect X-rays is displayed on the display screen 22 of the display device 21.

17 Claims, 22 Drawing Sheets

(56) References Cited

U.S. PATENT DOCUMENTS

| | | | |
|---|---|---|---|
| 2004/0258203 A1* | 12/2004 | Yamano | G01N 23/20 378/73 |
| 2006/0266954 A1 | 11/2006 | Sato et al. | |
| 2013/0138382 A1* | 5/2013 | Mitsunaga | G01N 23/20 702/123 |
| 2014/0098940 A1 | 4/2014 | Schnablegger et al. | |
| 2014/0151569 A1 | 6/2014 | Schnablegger et al. | |
| 2015/0041644 A1* | 2/2015 | Tsuno | H01J 37/244 250/307 |
| 2016/0202193 A1 | 7/2016 | Hench et al. | |

FOREIGN PATENT DOCUMENTS

| | | |
|---|---|---|
| JP | H08-101204 A | 4/1996 |
| JP | 2004-209152 A | 7/2004 |
| JP | 2008-002966 A | 1/2008 |
| JP | 2009-002805 A | 1/2009 |
| JP | 2013-214467 A | 10/2013 |

OTHER PUBLICATIONS

International Search Report of PCT/JP2018/002205, dated Apr. 24, 2018.

Extended (Supplementary) European Search Report dated Feb. 8, 2021, issued in counterpart EP Application No. 18775402.3. (11 pages).

Boris Pokric et al., "A double area detector system for simultaneous small and wide-angle X-ray scattering," Nuclear Instruments & Methods in Physics Research. Section A, Elsevier BV* North-Holland, NL, vol. 477, No. 1-3, Jan. 21, 2002, pp. 329-334, XP004345560; Cited in Extended European Search report dated Feb. 8, 2021. (6 pages).

Anonymous, "Xeuss 2.0: The SAXS/WAXS laboratory beamline," Jul. 22, 2014, XP055307089, Retrieved from the Internet: https://acs.expoplanner.com/files/acsfall16/ExhibFiles/1054_3957_Xenocs_Xeuss_Brochure_BD.pdf; Cited in Extended European Search report dated Feb. 8, 2021. (12 pages).

* cited by examiner

Fig. 5

[SETTING ITEM]

DETECTION MINIMUM RANGE Xmin: 0.1 °

DETECTION MAXIMUM RANGE Xmax: 10.0 °

DISTANCE L BETWEEN SAMPLE AND TWO-DIMENSIONAL DETECTOR: 550 mm

[ANGULAR RESOLUTION]
- ☐ HIGH
- ☐ MIDDLE
- ☐ LOW (FIXED ITEM)
- ☐ Xmax
- ☐ L

[OPERATION ITEM]
- ● FREQUENCY OF DETECTING OPERATION: ☐ NUMBER OF TIMES
- ● CHANGE MEASUREMENT RANGE
- ● INTERLOCK WITH MEASUREMENT RANGE
- ● DIVIDE MEASUREMENT RANGE ☐ 1/2 ☐ 1/4 ☐ 1/8 ☐ ARBITRARY DIVISION ☐ SYMMETRIC DIVISION
- ● SPECIFY MEASUREMENT RANGE
- ● READ MEASUREMENT DATA

DISPLAY GRID ☑

Labels: A, 23, Hmin, Hp, Hmax, G, 22

Fig. 7

[SETTING ITEM]
DETECTION MINIMUM RANGE Xmin: 0.1 °
DETECTION MAXIMUM RANGE Xmax: 10.0 °
DISTANCE L BETWEEN SAMPLE AND TWO-DIMENSIONAL DETECTOR: 550 mm

[ANGULAR RESOLUTION]
☐ HIGH
☐ MIDDLE
☐ LOW

[FIXED ITEM]
☐ Xmax
☐ L

[OPERATION ITEM]
● FREQUENCY OF DETECTING OPERATION: 3  NUMBER OF TIMES
● CHANGE MEASUREMENT RANGE  ☐ ☐ ☐
● INTERLOCK WITH MEASUREMENT RANGE
● DIVIDE MEASUREMENT RANGE
  ☐ 1/2  ☐ 1/4  ☐ 1/8  ☐ SYMMETRIC DIVISION  ☐ ARBITRARY DIVISION
● SPECIFY MEASUREMENT RANGE  ☐
● READ MEASUREMENT DATA

☐ DISPLAY GRID

Labels on diagram: 22, 23, A, Hp, Hmin, Hmax

(SETTING ITEM)

DETECTION MINIMUM RANGE Xmin: 0.1 °
DETECTION MAXIMUM RANGE Xmax: 10.0 °
DISTANCE L BETWEEN SAMPLE AND
TWO-DIMENSIONAL DETECTOR: 700 mm ☑ SPECIFY DETECTION AREA   r: ± 2 °   β: 20 °

☐ DISPLAY GRID (ANGULAR RESOLUTION)   (FIXED ITEM)
☐ HIGH    ☐ Xmax
☐ MIDDLE  ☐ L
☐ LOW (OPERATION ITEM)
● FREQUENCY OF DETECTING OPERATION:  NUMBER OF TIMES ☐ ☐ ☐
● CHANGE MEASUREMENT RANGE
● INTERLOCK WITH MEASUREMENT RANGE
● DIVIDE MEASUREMENT RANGE
  ☐ 1/2
  ☐ 1/4   ☐ SYMMETRIC DIVISION
  ☐ 1/8
  ☐ ARBITRARY DIVISION
● SPECIFY MEASUREMENT RANGE ☐
● READ MEASUREMENT DATA  C:¥DATA¥2016¥S01¥001.xxx

SET VALUE INFORMATION

■ DETECTION MINIMUM RANGE Xmin : 0.1°

■ DETECTION MAXIMUM RANGE Xmax : 10.0°

■ DISTANCE L BETWEEN SAMPLE AND TWO-DIMENSIONAL DETECTOR : 550mm
   (ANGULAR RESOLUTION : HIGH)

■ POSITION OF TWO-DIMENSIONAL DETECTOR (X-RAY DETECTION AREA A)

(1) FIRST DETECTION OPERATION  : X=30mm, Z=50mm
(2) SECOND DETECTION OPERATION : X=30mm, Z=80mm
(3) THIRD DETECTION OPERATION  : X=60mm, Z=50mm

X-RAY ANALYSIS ASSISTANCE DEVICE AND X-RAY ANALYSIS DEVICE

CROSS-REFERENCE TO RELATED APPLICATIONS

This application is a 35 U.S.C. § 371 national phase of PCT International Application No. PCT/JP2018/002205, filed Jan. 25, 2018, which claims the benefit of priority under 35 U.S.C. § 119 to Japanese Patent Application No. 2017-066694, filed Mar. 30, 2017, the contents of which are incorporated herein by reference in their entirety.

TECHNICAL FIELD

The present invention relates to an X-ray analysis assistance device that targets an X-ray analysis device for detecting X-rays scattered or diffracted by a sample by a two-dimensional detector when X-rays from an X-ray source are incident to the sample, and is used to set measurement conditions of the X-ray analysis device.

BACKGROUND

For example, a small-angle and wide-angle X-ray measurement apparatus disclosed in Japanese Patent Laid-Open No. 2009-2805 is an X-ray analysis device for detecting X-rays scattered by a sample when X-rays are made incident to the sample, and the structure of the sample can be analyzed based on X-ray information obtained by the X-ray analysis device.

In order to analyze the structure of a sample by using this type of X-ray analysis device, it is natural to know an operation procedure of the device in advance, and it is further necessary to master the operation of the device to some extent. The time required to set conditions for the device greatly changes depending on the degree of skill (i.e., the degree of experience), and the accuracy of obtained X-ray information also changes. Accordingly, in order to obtain X-ray information with high accuracy by a measurement which is as short as possible, it is preferable that a skilled operator operates the X-ray analysis device.

On the other hand, if there is a device for assisting setting of conditions for the device, even a less experienced operator could set appropriate conditions in a short time. However, this type of X-ray analysis assistance device has not yet been developed.

The present invention has been made in view of the above-described circumstances, and provides an X-ray analysis assistance device capable of performing setting of appropriate measurement conditions in a short time even by an operator who has little experienced the operation of an X-ray analysis device.

SUMMARY

An X-ray analysis assistance device according to the present invention targets an X-ray analysis device for detecting X-rays scattered or diffracted by a sample with a two-dimensional detector when X-rays from an X-ray source are incident to the sample, and is used to set measurement conditions of the X-ray analysis device.

The targeted X-ray analysis device is, for example, a small-angle X-ray scattering measurement apparatus. However, it is needless to say that the present invention is not limited to an application to the apparatus.

In recent years, a two-dimensional semiconductor detector having high accuracy and high resolution has been frequently used as a two-dimensional detector. The two-dimensional semiconductor detector has a small area where X-rays can be detected, so that it is particularly difficult to set appropriate measurement conditions for obtaining useful X-ray information. Therefore, the application of the X-ray analysis assistance device according to the present invention is particularly effective for an X-ray analysis device using a two-dimensional semiconductor detector.

The X-ray analysis assistance device according to the present invention contains, as setting items, a distance L between the sample and the two-dimensional detector and a detection maximum range Xmax in which measurement data of the X-rays scattered or diffracted by the sample are desired to be acquired.

The set detection maximum range Xmax of X-rays is a maximum angular range on a wide-angle side of the X-rays scattered or diffracted radially from the sample in which measurement data of the X-rays can be acquired. For example, in the small-angle X-ray scattering measurement apparatus, the detection maximum range Xmax can be set based on any one of a scattering or diffraction vector Q of X-rays scattered or diffracted by the sample, a scattering or diffraction angle 2θ of X-rays scattered or diffracted by the sample with respect to an optical axis of X-rays incident to the sample, and a sized in the structure of the sample.

The X-ray analysis assistance device according to the present invention contains, as display items, an X-ray detection area A representing a range in which a detection face of the two-dimensional detector can detect X-rays, and a maximum measurement frame Hmax representing a boundary on a wide-angle side where X-rays in the detection maximum range Xmax are incident to a measurement plane containing the detection face of the two-dimensional detector.

The X-ray analysis assistance device according to the present invention comprises set value inputting unit adapted to input one of values corresponding to the distance L and the detection maximum range Xmax, automatic setting unit adapted to automatically set one setting item based on the value corresponding to the other setting item input by the set value inputting unit, and display unit adapted to display the maximum measurement frame Hmax on a display screen based on the distance L and the detection maximum range Xmax and display the X-ray detection area A on the display screen based on the distance L and the detection maximum range Xmax.

In the X-ray analysis device, when X-rays are incident to a sample, scattering or diffraction of X-rays occurs radially in the sample. When the two-dimensional detector is arranged near to the sample, such radially scattered or diffracted X-rays can be made incident to a detection face of the two-dimensional detector in a wide angular range. Conversely, when the two-dimensional detector is arranged apart from the sample, the angular range of X-rays that can be detected by the two-dimensional detector is narrow. On the other hand, the angular resolution of X-rays that can be detected by the two-dimensional detector is better as the two-dimensional detector is farther from the sample.

Furthermore, when the incident range of X-rays scattered or diffracted radially from the sample to a measurement plane is wider than the detection face of the two-dimensional detector, it is required to consider an angular position of incident X-rays on the measurement plane where the X-rays are to be detected by the two-dimensional detector.

An operator must set measurement conditions in consideration of these relationships, but X-rays cannot be visually recognized, so that it is usually impossible to perform an adjustment operation while making X-rays incident to the sample. Therefore, the operator must set the measurement conditions while being unable to check an actual situation, and abundance of experience (i.e., degree of skill) affects suitability of setting of the measurement conditions to some extent.

However, by using the X-ray analysis assistance device according to the present invention, when the operator inputs one of values corresponding to the distance L and the detection maximum range Xmax from set value inputting unit, automatic setting unit automatically sets the other setting item based on the value corresponding to the input one setting item. The display unit displays the maximum measurement frame Hmax on the display screen based on the distance L and the detection maximum range Xmax.

Here, the value corresponding to the distance L or the detection maximum range Xmax is not limited to the distance L or the detection maximum range Xmax, but may be a value having a correlation with those values. The maximum measurement frame Hmax is a boundary on a wide-angle side where X-rays in the detection maximum range Xmax are incident to the measurement plane containing the detection face of the two-dimensional detector. The operator can visually check the maximum measurement frame Hmax displayed on the display screen. Furthermore, the X-ray detection area A is displayed on the display screen. The X-ray detection area A is a range where X-rays can be detected by the detection face of the two-dimensional detector. The operator can visually check the X-ray detection area A and the maximum measurement frame Hmax on the display screen. In this way, the operator can consider the appropriateness of the setting of the distance L and the detection maximum range Xmax while visually checking the maximum measurement frame Hmax and the X-ray detection area A on the display screen. Even an operator who has little experience in operating the X-ray analysis device can perform appropriate condition setting in a short time.

Furthermore, the X-ray analysis assistance device according to the present invention may contain, as the setting item, a detection minimum range Xmin where measurement data of the X-rays scattered or diffracted by the sample are desired to be acquired, and contain, as the display item, a minimum measurement frame Hmin representing a boundary on a low-angle side where X-rays in the detection minimum range Xmin are incident to the measurement plane. The set value inputting unit may have a function of inputting and setting one of the distance L and the detection minimum range Xmin, and the display unit may have a function of displaying the minimum measurement frame Hmin on the display screen based on the distance L and the detection minimum range Xmin.

The X-ray detection minimum range Xmin set here is a minimum angular range on the low-angle side for X-rays which are radially scattered or diffracted from the sample can be acquired as measurement data. For example, in the small-angle X-ray scattering measurement apparatus, this detection minimum range Xmin can be also set based on any one of the scattering or diffraction vector Q of X-rays scattered or diffracted by the sample, the scattering angle or diffraction angle $2\theta$ of X-rays scattered or diffracted by the sample with respect to the optical axis of X-rays incident to the sample, or the size d in the structure of the sample as in the case of the detection maximum range Xmax.

By adding the configuration as described above, when the operator inputs one of the distance L and the detection minimum range Xmin from the set value inputting unit, the minimum measurement frame Hmin is displayed on the display screen. The minimum measurement frame Hmin is a boundary on a low-angle side where X-rays in the detection minimum range Xmin are incident to the measurement plane. As the minimum measurement frame Hmin spreads to the wide-angle side, the angular resolution of X-rays that can be detected by the two-dimensional detector is higher. Therefore, it is possible to consider appropriateness of the setting of the distance L between the sample and the two-dimensional detector by visually checking the minimum measurement frame Hmin displayed on the display screen and considering a permissible angular resolution from X-ray information which is desired to be acquired by measurement.

It is preferable that the X-ray analysis assistance device according to the present invention includes display changing unit adapted to issue an instruction for changing contents displayed on the display screen. By providing this display changing unit, contents for assisting the consideration when measurement conditions are set, and contents that can be visually considered increase, so that it is possible to realize more appropriate condition setting.

In the thus-configured X-ray analysis assistance device according to the present invention, the display changing unit may be configured to issue an instruction for displaying a grid on the display screen, and the display unit may be configured to have a function of displaying a grid having squares each having the same size and shape as the X-ray detection area A on the display screen based on the instruction.

For example, the operator can consider the position of the X-ray detection area A with respect to the maximum measurement frame Hmax by referring to the grid displayed on the display screen.

In the X-ray analysis assistance device according to the present invention configured to include the display changing unit, the display changing unit may be configured to issue an instruction for moving the X-ray detection area A displayed on the display screen, and the display unit may be configured to have a function of moving the X-ray detection area A within the display screen based on the instruction.

For example, the operator can consider the optimal position of the X-ray detection area A with respect to the maximum measurement frame Hmax by moving the X-ray detection area A within the display screen.

In the X-ray analysis assistance device according to the present invention configured to include the display changing unit, the display changing unit may be configured to issue an instruction for displaying a plurality of X-ray detection areas A on the display screen, and the display unit may be configured to have a function of displaying a plurality of X-ray detection areas A on the display screen based on the instruction.

For example, the operator can consider an optimal X-ray detection area for the maximum measurement frame Hmax by displaying the plurality of X-ray detection areas A on the display screen.

In the X-ray analysis assistance device according to the present invention configured to include the display changing unit, the display changing unit may be configured to issue an instruction for displaying any number of X-ray detection areas A at any position on the display screen, and the display unit may be configured to have a function of displaying any number of X-ray detection areas A at any positions on the display screen based on the instruction.

The operator can set measurement conditions so that X-rays incident to the measurement area within the maximum measurement frame Hmax can be appropriately and efficiently detected by the two-dimensional detector by displaying any number of X-ray detection areas A at any positions on the display screen.

In the X-ray analysis assistance device according to the present invention configured to include the display changing unit, the display changing unit may be configured to issue an instruction for changing a size of the maximum measurement frame Hmax displayed on the display screen, the display unit may be configured to have a function of changing the size of the maximum measurement frame Hmax displayed on the display screen based on the instruction, and the automatic setting unit may be configured to have a function of automatically setting the distance L or the detection maximum range Xmax based on the changed maximum measurement frame Hmax.

For example, the operator can consider the size of the optimum maximum measurement frame Hmax for the X-ray detection area A by changing the size of the maximum measurement frame Hmax. Since the distance L or the detection maximum range Xmax is automatically reset with the change of the size of the maximum measurement frame Hmax, the operator is free from complicated calculations.

In the X-ray analysis assistance device according to the present invention configured to include the display changing unit, the display changing unit may be configured to issue an instruction for changing the size of the maximum measurement frame Hmax in accordance with an outer edge of the X-ray detection area A displayed on the display screen, the display unit may be configured to have a function of changing the size of the maximum measurement frame Hmax in accordance with the outer edge of the X-ray detection area A displayed on the display screen based on the instruction, and the automatic setting unit may be configured to have a function of automatically setting the distance L or the detection maximum range Xmax based on the changed maximum measurement frame Hmax.

For example, the operator can determine the size of the optimum maximum measurement frame Hmax for the X-ray detection area A by changing the maximum measurement frame Hmax in accordance with the outer edge of the X-ray detection area A. In this case, since the distance L or the detection maximum range Xmax is also automatically reset with the change of the maximum measurement frame Hmax, the operator is free from the complicated calculation.

In the X-ray analysis assistance device according to the present invention configured to include the display changing unit, the display changing unit may be configured to issue an instruction for dividing a measurement area within the maximum measurement frame Hmax displayed on the display screen and displaying a part of the divided measurement area, and the display unit may be configured to have a function of dividing the measurement area within the maximum measurement frame Hmax displayed on the display screen and displaying a part of the divided measurement area based on the instruction.

For example, the operator can adjust the range in which X-rays from the sample are desired to be detected by dividing the measurement area in the maximum measurement frame Hmax and displaying a part of the measurement area.

In the thus-configured X-ray analysis assistance device according to the present invention, the automatic setting unit may be configured to have a function of automatically setting the number and arrangement of the X-ray detection areas A so as to cover the measurement area within the maximum measurement frame Hmax which is divided and displayed in part, and the display unit may be configured to have a function of displaying the automatically set number and arrangement of the X-ray detection areas A on the display screen.

With this configuration, the operator can set measurement conditions so that X-rays incident to the measurement area within the optimum maximum measurement frame Hmax can be efficiently detected by the two-dimensional detector without waste.

In the X-ray analysis assistance device according to the present invention configured to include the display changing unit, the display changing unit may be configured to issue an instruction for displaying a specified measurement range H having any size and any shape at any position on the display screen, the display unit may be configured to have a function of displaying a specified measurement range H having any size and any shape at any position on the display screen based on the instruction, the automatic setting unit may be configured to have a function of automatically setting the number and arrangement of the X-ray detection areas A so as to cover the specified measurement range H displayed on the display screen, and the display unit may be configured to have a function of displaying the automatically set number of the X-ray detection areas A in the automatically set arrangement on the display screen.

The operator causes a specified measurement range H having any size and any shape to be displayed at any position on the display screen, whereby X-ray detection areas A are displayed on the display screen with a number and an arrangement thereof covering the specified measurement range H. For example, the operator can set measurement conditions so that X-rays from the sample can be detected appropriately and efficiently by the two-dimensional detector while visually checking the specified measurement range H and the X-ray detection area A.

The X-ray analysis assistance device according to the present invention may be configured to further comprise data reading unit adapted to read existing measurement data containing X-ray information detected by the two-dimensional detector, and the display unit may be configured to have a function of displaying, on the display screen, X-ray information contained in measurement data read by the data reading unit.

The operator can visually consider the setting of the measurement conditions while referring to the X-ray information displayed on the display screen.

An X-ray analysis device according to the present invention comprises an X-ray source for making X-rays incident to a sample, a two-dimensional detector for detecting X-rays scattered or diffracted by the sample, and an X-ray analysis assistance device for setting measurement conditions. Here, the X-ray analysis assistance device according to the present invention configured described above is applied to the X-ray analysis assistance device.

As described above, according to the X-ray analysis assistance device of the present invention, the operator can appropriately set measurement conditions in a short time while visually checking the display content of the display screen.

BRIEF DESCRIPTION OF THE DRAWINGS

FIG. 5 is a diagram showing an example of the display screen in which a display content is changed;

FIG. 7 is a diagram showing still another example of the display screen in which the display content is changed;

FIG. 11 is a diagram showing an example of the display screen in which the display content is changed subsequently to the display screen in FIG. 10;

FIG. 17 is a diagram showing a display screen in an application example of the embodiment according to the present invention;

FIG. 18 is a diagram showing a display screen in the application example of the embodiment according to the present invention, which is subsequent to FIG. 17;

FIG. 19 is a diagram showing another display screen in the application example of the embodiment according to the present invention, which is subsequent to FIG. 17;

FIG. 20 is a diagram showing another display screen in the application example of the embodiment according to the present invention shown in FIG. 17;

FIG. 21 is a diagram showing another display screen in the application example of the embodiment according to the present invention, which is subsequent to FIG. 17; and FIG. 22 is a diagram showing a print example of set value information determined by using the X-ray analysis assistance device according to the embodiment of the present invention.

DESCRIPTION OF REFERENCE SIGNS

1: sample stage, S: sample, 2: two-dimensional detector, 3: X-ray generator, 3a: X-ray source, 4: X-ray focusing device, 4a: X-ray focusing element, 5: first slit portion, 5a: first slit, 6: second slit portion, 6a: second slit, 7: third slit portion, 7a: third slit, 8: first pressure-reduced path, 9: second pressure-reduced path, 10: third pressure-reduced path, 11: moving stage, 12: direct beam stopper, 20: central processing unit, 21: display device, 22: display screen, 23: cursor, 24: input/operation device, 25: storage device, 26: output device.

DESCRIPTION OF EMBODIMENT OF THE INVENTION

Hereinafter, an embodiment of the present invention will be described in detail with reference to the drawings.

An X-ray analysis assistance device according to the present embodiment is configured to be applied to a small-angle X-ray scattering measurement apparatus and assume setting of measurement conditions for the small-angle X-ray scattering measurement apparatus.

The small-angle X-ray scattering measurement apparatus is an X-ray analysis device for measuring X-rays scattered in a low angle region of $0°<2\theta$ (diffraction angle)$\leq 5°$ out of X-rays scattered by a sample S when X-rays are incident to the sample S to evaluate the structure of the sample S, and it is generally used to evaluate structures of sizes of about several nm to several hundred nm.

Figure 1A:
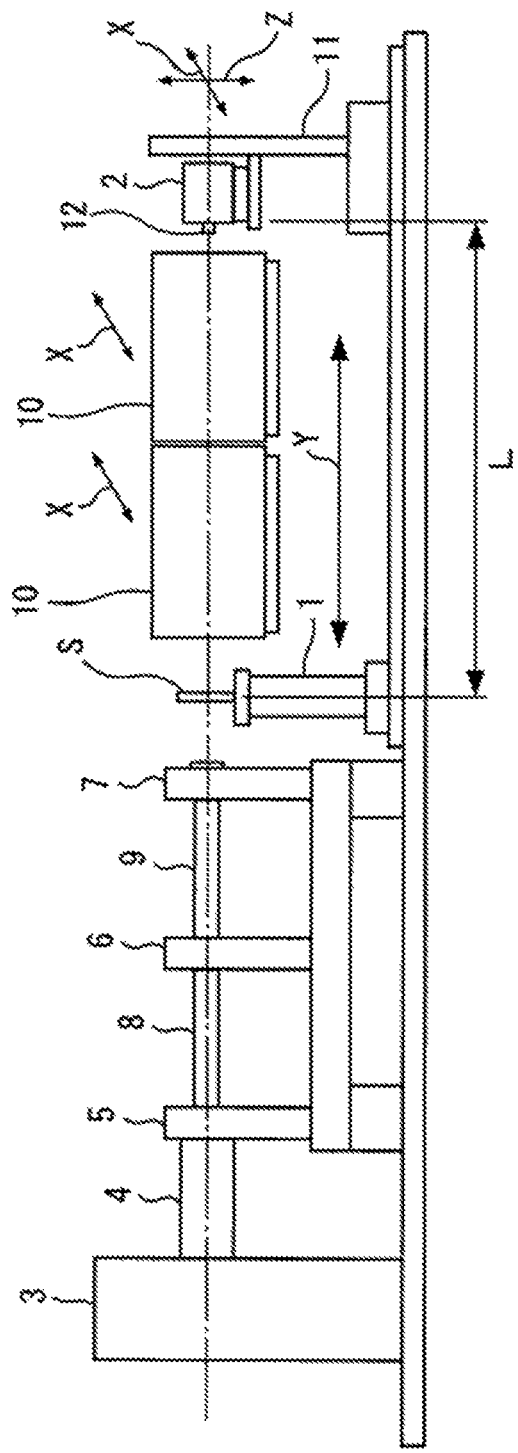
FIG. 1A is a front view schematically showing an outline of a small-angle X-ray scattering measurement apparatus.
Figure 1B:
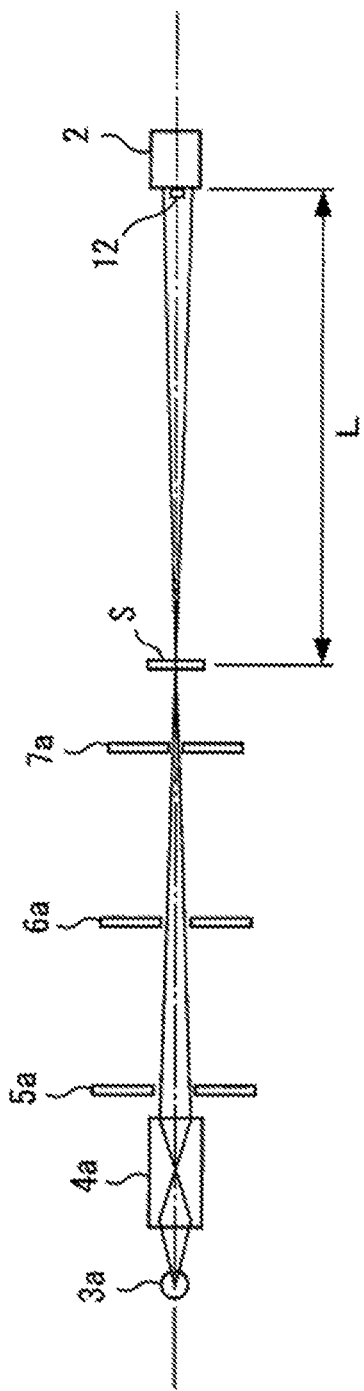
FIG. 1B is a schematic diagram showing an optical system of the small-angle X-ray scattering measurement apparatus.

FIG. 1A is a front view schematically showing an outline of the small-angle X-ray scattering measurement apparatus. FIG. 1B is a schematic diagram showing an optical system of the small-angle X-ray scattering measurement apparatus.

Note that in FIGS. 1A and 1B, a right-and-left direction on the paper surface is defined as a Y-direction, a vertical direction to the paper surface is defined as an X-direction, an up-and-down direction on the paper surface is defined as a Z-direction, and the small-angle X-ray scattering measurement apparatus is installed so that a X-ray traveling direction (the longitudinal direction of the apparatus) is aligned with the Y-direction.

In FIG. 1A, the small-angle X-ray scattering measurement apparatus includes a sample stage 1 at a substantially center position, and a sample S as a measurement target is placed on the sample stage 1. An incidence-side optical system is installed on one side of the sample stage 1 and a two-dimensional detector 2 is installed on the other side of the sample stage 1 with the sample stage 1 being interposed therebetween.

The incidence-side optical system includes an X-ray generator 3, an X-ray focusing device 4, a first slit portion 5, a second slit portion 6, and a third slit portion 7. A two-dimensional semiconductor detector is used as the two-dimensional detector 2.

A first pressure-reduced path 8 is provided between the first slit portion 5 and the second slit portion 6, and a second pressure-reduced path 9 is provided between the second slit portion 6 and the third slit portion 7. A third pressure-reduced path 10 is further provided between the sample stage 1 and the two-dimensional detector 2.

The first pressure-reduced pass 8 and the second pressure-reduced pass 9 are tubular members each having a constant length and an airtight structure. The third pressure-reduced path 10 is configured by one or more cylindrical members each having an airtight structure. The plural cylindrical members are freely movable in the X-direction in FIG. 1A, and an appropriate number of cylindrical members can be arranged between the sample S and the two-dimensional detector 2 according to the distance between the sample S and the two-dimensional detector 2. Note that the distance between the sample S and the two-dimensional detector 2 can be freely adjusted by movement as described later.

The inside of each of the pressure-reduced paths 8, 9, and 10 is reduced in pressure by a pressure reducing device (for example, a rotary pump or a turbo molecular pump) (as not shown), and set to a vacuum state or a pressure-reduced state close to vacuum. This pressure reduction is a countermeasure to prevent a background component from increasing in measurement data due to generation of unnecessary scattered radiation caused by an air scattering phenomenon and also prevent absorption of X-rays by air.

In the present embodiment, the two-dimensional semiconductor detector is used as the two-dimensional detector 2. The semiconductor detector is an X-ray detector utilizing generation of electrons when X-rays are applied to a semiconductor such as silicon or germanium, and the semiconductor detector has been widely used for the X-ray analysis device because it has very high resolution for energy (X-ray intensity), and can detect X-rays in a short time. However, the size of semiconductor material that can be produced by a present semiconductor manufacturing technique is limited, and the price of the semiconductor material increases as the size is larger. Therefore, a semiconductor detector having a small rectangular detection face of about several centimeters in height and width is generally used.

As described above, the two-dimensional semiconductor detector has a small area where X-rays can be detected on the detection face, and may not cover the entire range of X-rays scattered radially from a sample S when the two-dimensional semiconductor detector is applied to a small-angle X-ray scattering measurement apparatus.

Therefore, the small-angle X-ray scattering measurement apparatus shown in FIGS. 1A and 1B is configured so that the two-dimensional detector 2 is mounted on a moving stage 11 and can be moved together with the moving stage 11 in the Z-direction and the X-direction. As a result, the detection position of X-rays by the two-dimensional detector 2 is shifted arbitrarily, whereby a measurement range of X-rays scattered radially from a sample S can be divisionally measured in multiple times.

A direct beam stopper 12 is arranged in front of the detection face of the two-dimensional detector 2. The direct beam stopper 12 is formed of a material that does not transmit X-rays therethrough, and is provided on the optical axis (center axis) of X-rays that are incident from an X-ray source 3a to the sample S and reflected from or transmitted through the sample S. The direct beam stopper 12 has a function of preventing direct incidence of X-rays (direct beam) from the X-ray source 3a to the detection face of the two-dimensional detector 2, and causing only X-rays scattered or diffracted by the sample S necessary for analysis of the sample S to be incident to the detection face of the two-dimensional detector 2.

The apparatus is configured so that the distance L between the sample S and the two-dimensional detector 2 can be arbitrarily adjusted by movement. In the small-angle X-ray scattering measurement apparatus of the present embodiment shown in FIGS. 1A and 1B, the sample stage 1 is freely movable along a guide rail extending in the Y-direction, and the distance L between the sample S and the two-dimensional detector 2 can be arbitrarily changed by moving the sample stage 1. Note that when there is a risk that the cylindrical member constituting the third pressure-reduced path 10 may interfere with the sample stage 1, the cylindrical member is retracted from the movement path of the sample stage 1.

Next, the optical system of the small-angle X-ray scattering measurement apparatus having the above-described configuration and the operation of the optical system will be described.

As shown in FIG. 1B, the X-ray source 3a is provided inside the X-ray generator 3, an X-ray focusing element 4a configured by a multilayer mirror or the like is provided inside the X-ray focusing device 4, a first slit 5a is provided inside the first slit portion 5, a second slit 6a is provided inside the second slit portion 6, and a third slit 7a is provided inside the third slit portion 7.

For example, point-focused X-rays including CuKα rays are emitted from the X-ray source 3a, and the X-rays are reflected by components of the X-ray focusing element 4a to form a beam so that the beam is focused on a specific point. The X-rays are incident to the sample S while the divergence thereof is suppressed by the first slit 5a and the second slit 6a. At this time, the third slit 7a prevents unnecessary scattered radiation from entering the sample S.

When X-rays are incident to the sample S, the X-rays are scattered at an angular position of a scattering angle (diffraction angle) $2\theta$ specific to the sample S within a small angle region ($0°<2\theta\leq 5°$) due to a nano ($10^{-9}$ m) structure contained in the sample S. The scatter X-rays are incident to the detection face of the two-dimensional detector 2, and two-dimensional incident positions and X-ray intensities are acquired as X-ray information. By analyzing this X-ray information, an internal nanoscale ($10^{-9}$ m) structure of the sample S, more specifically structures from a molecular level structure (a macro structure of 1 nm to 100 nm) to an atomic level structure (a microstructure of 0.2 nm to 1 nm) can be evaluated.

Note that although not particularly shown in FIGS. 1A and 1B, the small-angle X-ray scattering measurement apparatus can be equipped with accessory devices such as a load applying device, a temperature control device, a humidity control device or the like for the sample S. The load applying device is a device capable of applying a tensile or compressive load to the sample S. The temperature control device is a device capable of controlling to increase or reduce the temperature of the sample S. The humidity control device is a device capable of controlling to increase or reduce the humidity around the sample S.

When a small-angle X-ray scattering measurement is performed while dynamically changing the state of the sample S by using such accessory devices, the state of the sample S changes over time, so that it is impossible to secure the time for X-ray detection by the two-dimensional detector 2 and perform operations such as an operation of performing detection at plural times while changing the detection position. On the other hand, in the case of a static measurement environment in which the state of the sample S is not changed, it is possible to secure the time for X-ray detection and freely perform detection at plural times while changing the detection position.

Figure 2B:
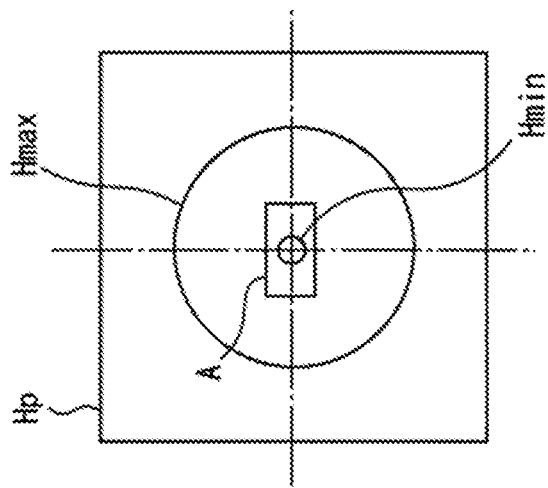
FIG. 2B is a right-side view showing the setting items of the measurement conditions when the sample is analyzed by the small-angle X-ray scattering measurement apparatus.
Figure 2A:
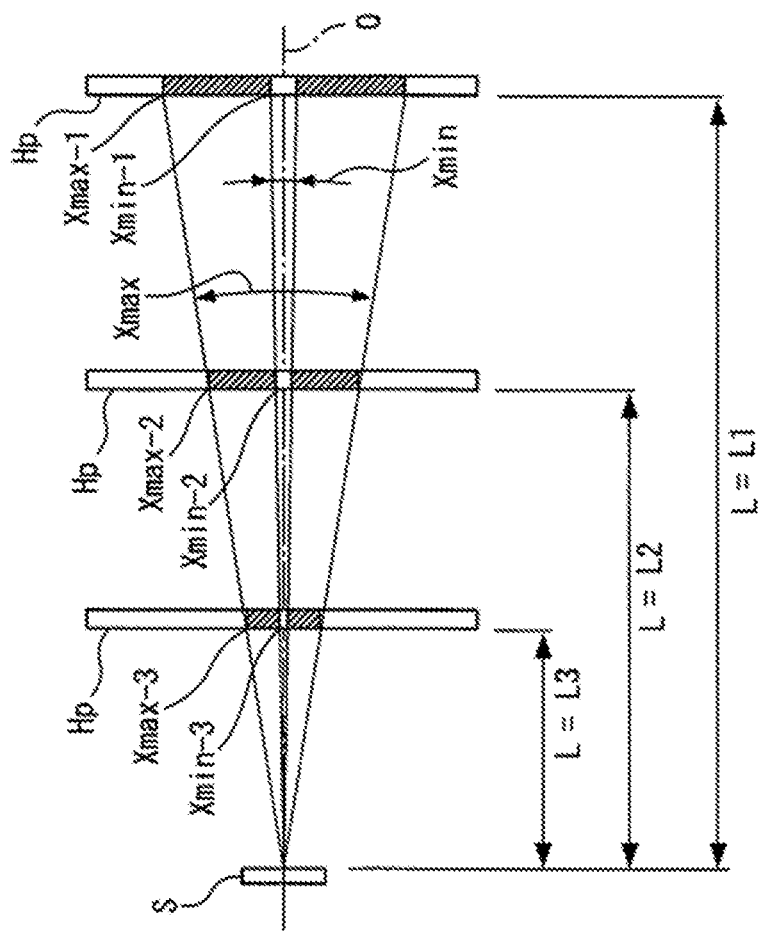
FIG. 2A is a front view showing setting items of measurement conditions when a sample is analyzed by the small-angle X-ray scattering measurement apparatus.

FIGS. 2A and 2B are diagrams showing setting items of measurement conditions when the analysis of the sample S is performed by the small-angle X-ray scattering measurement apparatus.

In these figures, "Hp" represents a measurement plane including the detection face of the two-dimensional detector 2, and the measurement plane Hp is drawn at plural positions among which the distance L between the sample S and the two-dimensional detector 2 is changed.

When X-rays from the X-ray source 3a are incident to the sample S, the X-rays are scattered radially around the optical axis O of the incident X-rays from the sample S. In the case of the measurement of the scatter X-rays on the measurement plane Hp by the two-dimensional detector 2, when the distance L between the sample S and the two-dimensional detector 2 is changed as shown in FIG. 2A, an angular range Xmax-1 in which the scatter X-rays can be measured on the measurement plane Hp is smaller at a position of L=L1 where the distance L is long, and conversely, an angular range Xmax-3 in which the scatter X-rays can be measured on the measurement plane Hp is larger at a position of L=L3 where the distance L is short.

Here, as the distance L between the sample S and the two-dimensional detector 2 is shorter, it is more difficult for the two-dimensional detector 2 to distinguish a minute angular difference for incidence of the X-rays. In other words, the angular resolution is reduced. Therefore, it is preferable that the distance L between the sample S and the two-dimensional detector 2 is increased in order to detect the scatter X-rays scattered in a low angle region with high accuracy.

An operator sets, as measurement conditions, the distance L between the sample S and the two-dimensional detector 2, a detection maximum range Xmax for measurement data of X-rays scattered by the sample S which are desired to be obtained, and a detection minimum range Xmin for measurement data of X-rays scattered by the sample S which are desired to be obtained while considering the above-described relationship and circumstances.

Specifically, in the case of the small-angle X-ray scattering measurement apparatus, the detection maximum range Xmax and the detection minimum range Xmin are set based on any one of a scattering vector Q of X-ray scattered by the sample S, a scattering angle 2θ of X-rays scattered by the sample S with respect to the optical axis of incident X-rays to the sample S, and the size d (for example, crystal lattice planes) in the structure of the sample S.

When a region where X-rays in the detection maximum range Xmax are incident to the measurement plane Hp (a region within a maximum measurement frame Hmax) is larger than a range where the detection face of the two-dimensional detector 2 can detect X-rays (X-ray detection region A), it is impossible to detect X-rays in the entire range of the maximum measurement frame Hmax by one measurement operation. Therefore, in this case, it is necessary that the two-dimensional detector 2 is moved to locate the X-ray detection area A at plural positions with respect to the measurement plane Hp, and the X-ray detection operation by the two-dimensional detector 2 is performed over plural times.

However, when the small-angle X-ray scattering measurement is performed while the state of the sample S is dynamically changed by using accessory devices such as the load applying device, the temperature control device, and the humidity control device as described above, it is impossible to perform the detection operation at plural times while changing the detection position because the state of the sample S changes over time.

Therefore, a case where the small-angle X-ray scattering measurement is performed while the state of the sample S is dynamically changed by using the accessory devices, and a case where the small-angle X-ray scattering measurement is performed under a static measurement environment where the state of the sample S is not changed are discriminated from each other. In the former case, in order to obtain X-ray information necessary for analysis of the sample S by one detection operation, it is required to consider the size of the maximum measurement frame Hmax with respect to the X-ray detection area A and also consider the position of the X-ray detection area A with respect to the measurement plane Hp.

Furthermore, in the latter case, it is required to consider how to arrange the X-ray detection area A with respect to the measurement plane Hp and also consider how many times the detection operation should be performed to acquire the X-ray information necessary for analysis.

Next, the X-ray analysis assistance device according to the present embodiment will be described in detail.

Figure 3:
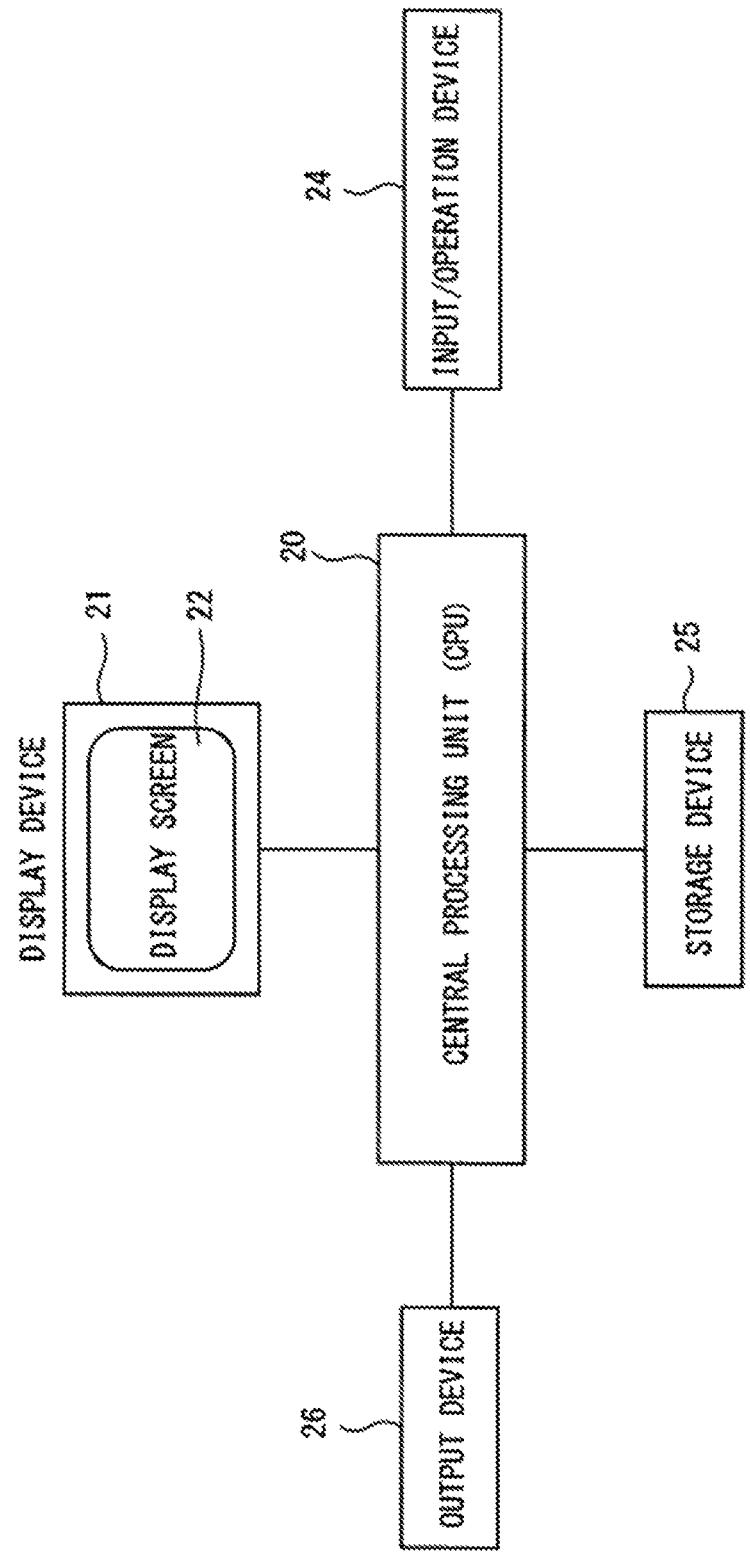
FIG. 3 is a block diagram showing a schematic structure of an X-ray analysis assistance device according to an embodiment of the present invention.

FIG. 3 is a block diagram showing a schematic structure of the X-ray analysis assistance device.

The X-ray analysis assistance device includes a central processing unit 20, a display device 21, an input/operation device 24, a storage device 25 and an output device 26.

The central processing unit 20 (CPU) is configured by, for example, a personal computer, operates in accordance with a preinstalled X-ray analysis assistance program, executes necessary arithmetic processing, and controls peripheral devices.

The display device 21 is a peripheral device that is configured by a liquid crystal display or the like, displays information necessary for setting measurement conditions on the display screen 22, and enables the operator to visually recognize and use the information.

The input/operation device 24 is a peripheral device which is configured by a mouse, a keyboard, etc., and inputs various set values and operates information displayed on the display screen 22 of the display device 21 when the operator sets measurement conditions. Note that in the case of adopting a touch display capable of inputting data onto the display screen 22 of the display device 21 by a touch operation, the display screen 22 also serves as the input/operation device 24.

The storage device 25 is a peripheral device which is configured by a hard disk drive (HDD), a solid state drive (SSD) or the like, and stores an X-ray analysis assistance program and measurement data and analysis data including X-ray information detected by the small-angle X-ray scattering measurement apparatus.

The output device 26 is a peripheral device which is configured by a printer or the like and prints a print screen of the display screen 22 or prints various set values and the like.

Figure 4:
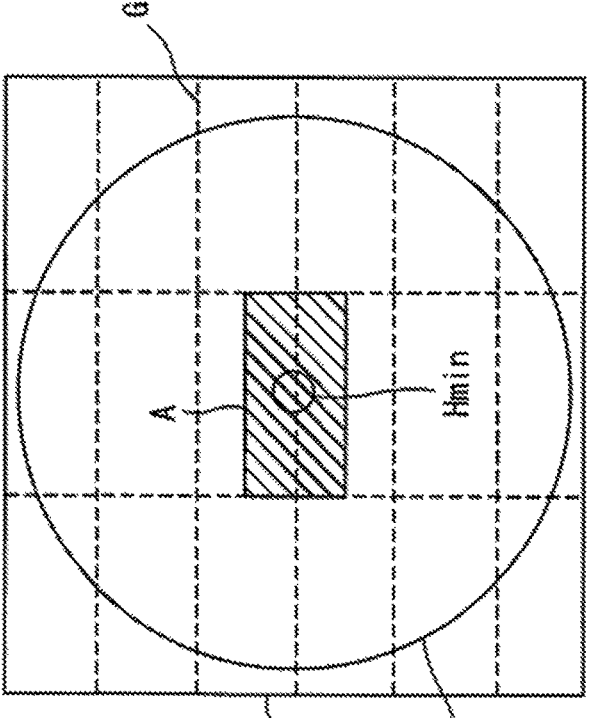
FIG. 4 is a diagram showing basic information displayed on a display screen of a display device in the X-ray analysis assistance device.

FIG. 4 is a diagram showing basic information displayed on the display screen 22 of the display device 21 in the X-ray analysis assistance device. By visually checking the information displayed on the display screen 22, the operator can refer to the information and appropriately set measurement conditions.

When the X-ray analysis assistance device is activated, information as shown in FIG. 4 is displayed on the display screen 22 of the display device 21. Specifically, setting items, display items, and operation items are displayed on the display screen 22.

The setting items include the distance L between the sample S and the two-dimensional detector 2 (hereinafter, may be simply abbreviated as "distance L"), the detection maximum range Xmax of X-rays scattered or diffracted by the sample S, and the detection minimum range Xmin of X-rays scattered or diffracted by the sample S. When the operator inputs either the distance L or the detection maximum range Xmax and the detection minimum range Xmin out of these setting items, the central processing unit 20 calculates the other setting item and automatically sets an optimal value, which is displayed on the corresponding portion of the display screen 22.

In other words, as shown in FIG. 2A, at the position of L=L1 where the distance L is long, the angular range Xmax-1 where X-rays can be measured on the measurement plane Hp is small, and the detection maximum range Xmax can be set with being limited to this angular range Xmax-1.

On the other hand, at the position of L=L3 where the distance L is short, the angular range Xmax-3 where X-rays can be measured on the measurement plane Hp is large, and the detection maximum range Xmax can be set with being limited to this angular range Xmax-3. The operator inputs any one of the distance L and the detection maximum range Xmax, whereby the other setting item is calculated by the central processing unit 20 based on this relationship and automatically set to an optimum value.

When the operator sets the detection minimum range Xmin together with the detection maximum range Xmax, the central processing unit 20 determines an angular resolution of the two-dimensional detector 2 at the distance L which is automatically set based on the detection maximum range Xmax, and determines whether the angular resolution can detect X-rays in the detection minimum range Xmin. When it is determined that X-rays in the detection minimum range Xmin cannot be detected, the distance L is automatically corrected to enhance the angular resolution up to a value that enables detection of X-rays in the detection minimum range Xmin. The thus automatically corrected distance L is displayed on the display screen 22.

Note that the display screen 22 may also include an item of "angular resolution" for roughly specifying an angular resolution desired by the operator. When the angular resolution is specified as "high" in the item of "angular resolution", the central processing unit 20 sets the distance L to be long within an adjustable range. On the other hand, when the angular resolution is specified as "low", the central processing unit 20 sets the distance L to be short within an adjustable range. When the distance L is set to be short, the region (region within the maximum measurement frame Hmax) where X-rays in the detection maximum range Xmax are incident to the measurement plane Hp becomes relatively small, so that the difference in area from the X-ray detection area A of the two-dimensional detector 2 becomes small, and it is possible to measure the entire area within the maximum measurement frame Hmax by a low measurement frequency.

As described above, the central processing unit 20 configures automatic setting unit for automatically setting the other setting item based on the value of the one setting item input by the operator. Furthermore, the display device 21 and the central processing unit 20 for controlling the display device 21 constitute display unit including a function of displaying various information on the display screen 22 and changing the display information. Specifically, the display device 21 and the central processing unit 20 have the following functions as the display unit. Note that the details of these functions will be described later:

(1) Based on the distance L and the detection maximum range Xmax, the maximum measurement frame Hmax is displayed on the display screen 22, and the X-ray detection area A is displayed on the display screen 22 (see FIG. 4).

(2) A grid in which one square has the same dimension and shape as the X-ray detection area A is displayed on the display screen 22 (see FIG. 4).

(3) The X-ray detection area A is moved on the display screen 22 (see FIG. 5).

Figure 6:
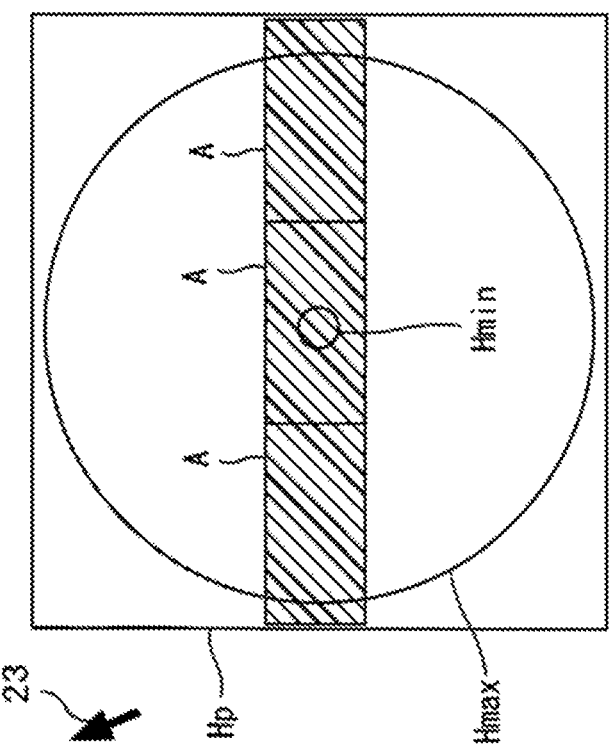
FIG. 6 is a diagram showing another example of the display screen in which the display content is changed.

(4) Plural X-ray detection areas A are displayed on the display screen 22 (see FIG. 6).

(5) Any number of X-ray detection areas A are displayed at any positions on the display screen 22 (see FIG. 7).

Figure 8:
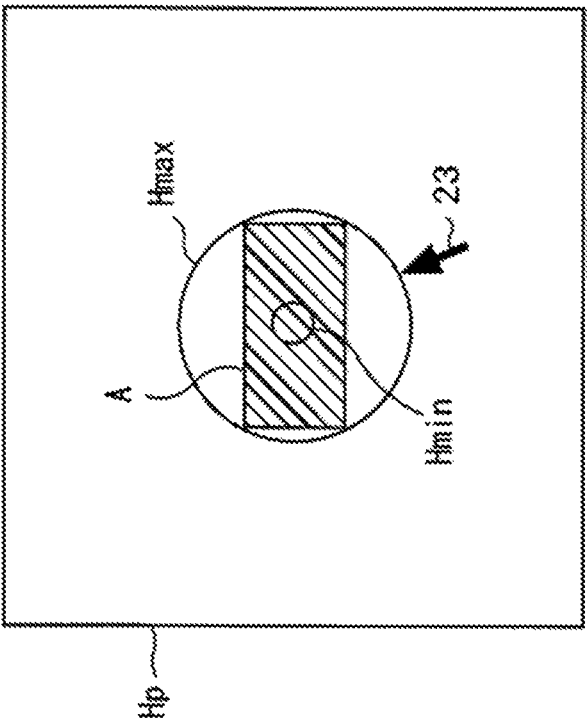
FIG. 8 is a diagram showing still another example of the display screen in which the display content is changed.

(6) The size of the maximum measurement frame Hmax displayed on the display screen 22 is changed (see FIG. 8).

Figure 9:
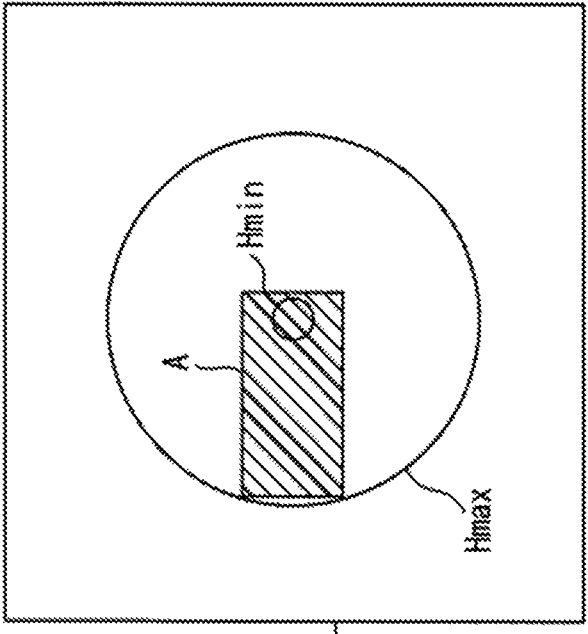
FIG. 9 is a diagram showing still another example of the display screen in which the display content is changed.

(7) The size of the maximum measurement frame Hmax is changed in accordance with the outer edge of the X-ray detection area A displayed on the display screen 22 (see FIG. 9).

Figure 10:
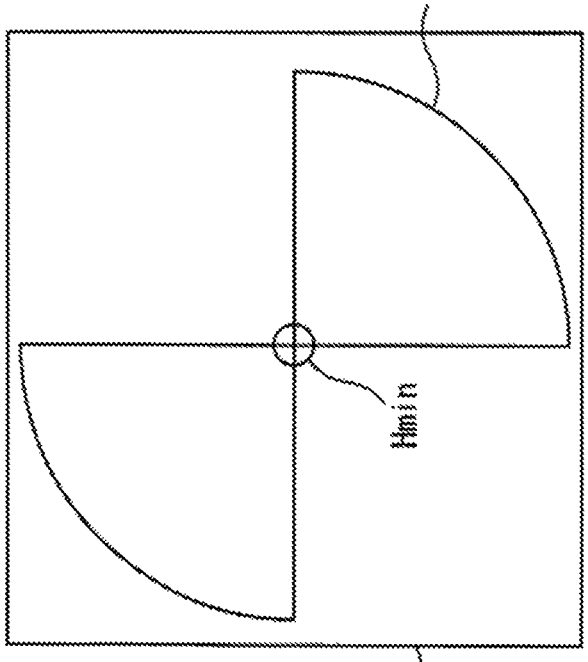
FIG. 10 is a diagram showing still another example of the display screen in which the display content is changed.

(8) The measurement area in the maximum measurement frame Hmax displayed on the display screen 22 is divided and a part thereof is displayed (see FIG. 10).

Figure 11:
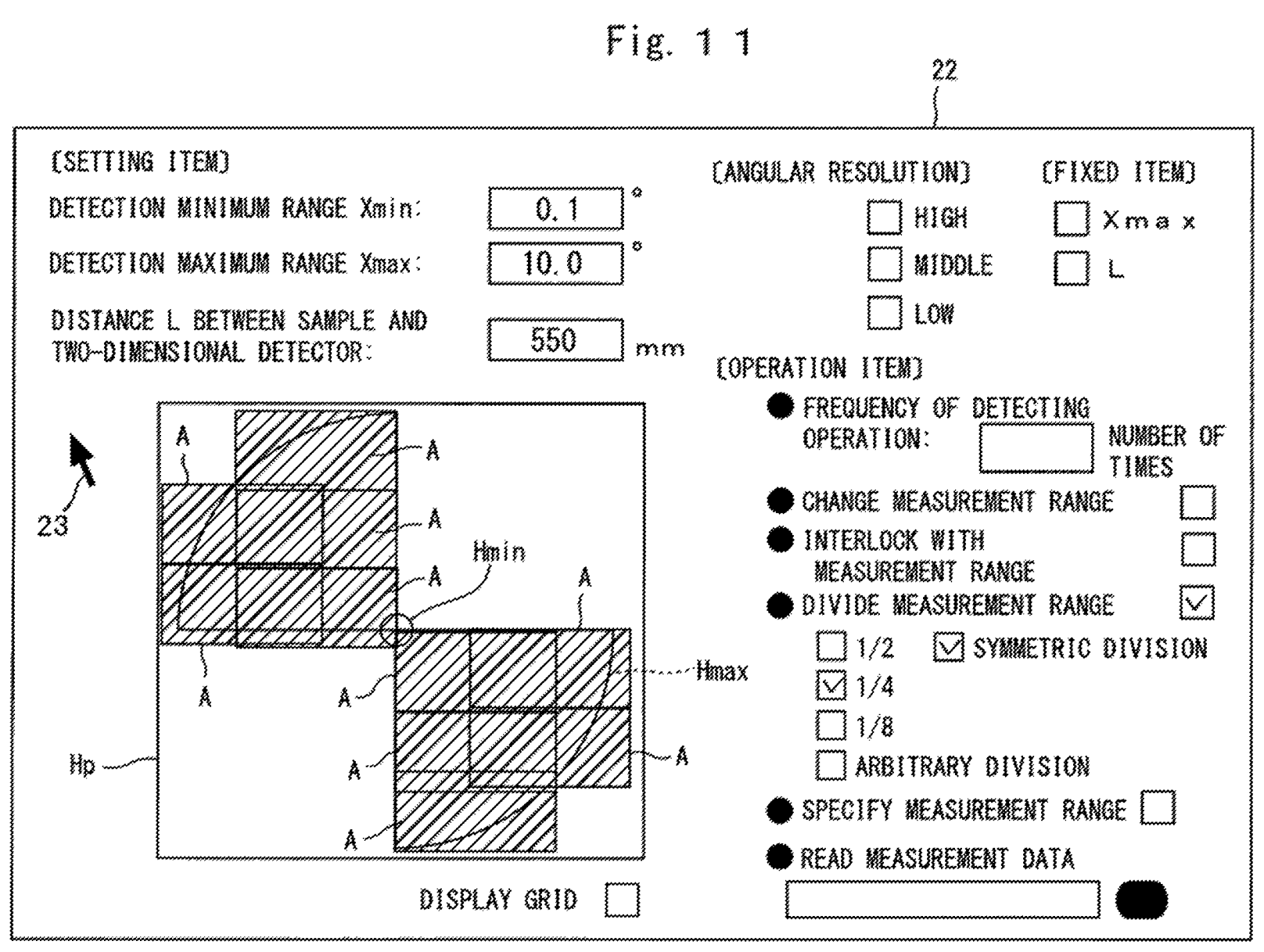

(9) The number and arrangement of X-ray detection areas A which are automatically set by the central processing unit 20 serving as automatic setting unit are displayed on the display screen 22 (see FIG. 11).

Figure 14:
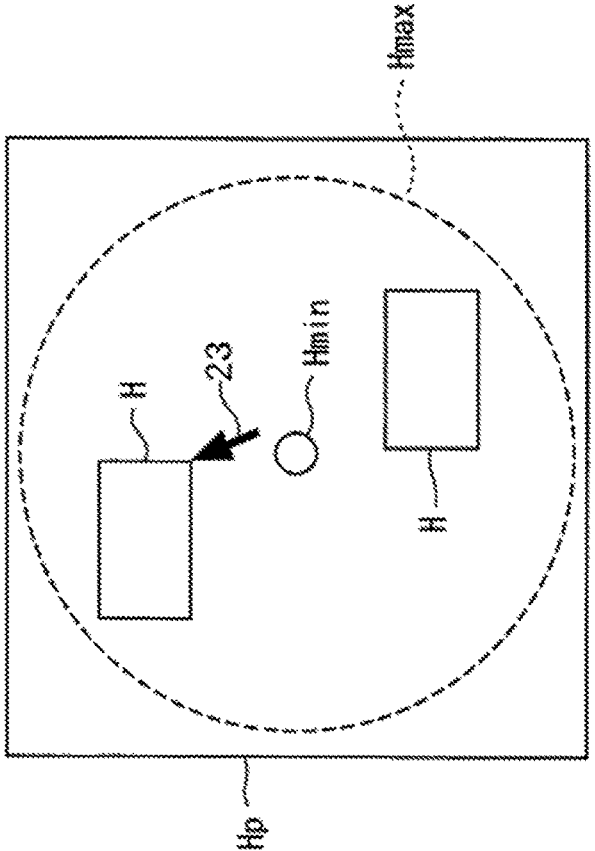
FIG. 14 is a diagram showing still another example of the display screen in which the display content is changed.

(10) A specified measurement range H having an any size and any shape is displayed at any position on the display screen 22 (see FIG. 14).

Figure 16:
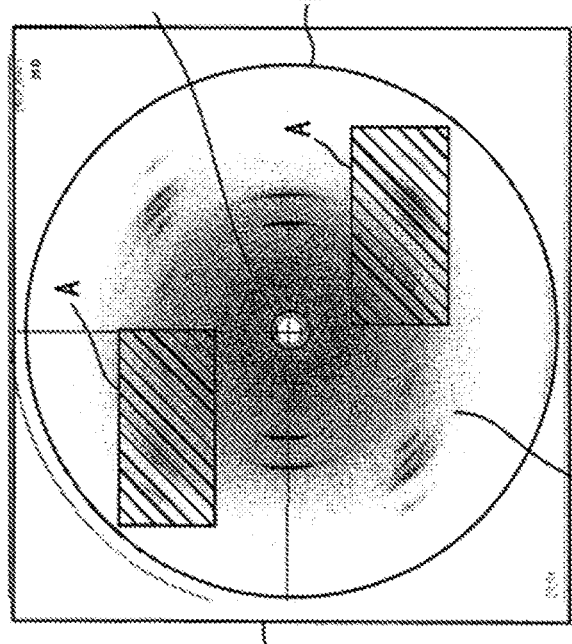
FIG. 16 is a diagram showing another example of the display screen in which the display content is changed.

(11) X-ray information contained in measurement data read by data reading unit is displayed on the display screen 22 (see FIG. 16).

Returning to FIGS. 3 and 4, the display device 21 is controlled by the central processing unit 20 to display a maximum measurement frame Hmax, a minimum measurement frame Hmin, the X-ray detection area A, etc. based on the distance L and the detection maximum range Xmax on the display screen 22.

Here, the maximum measurement frame Hmax is a boundary on a wide-angle side where X-rays in the detection maximum range Xmax are incident to the measurement plane Hp including the detection face of the two-dimensional detector 2. The minimum measurement frame Hmin is a boundary on a low-angle side where X-rays in the detection minimum range Xmin are incident to the measurement plane Hp including the detection face of the two-dimensional detector 2. The X-ray detection area A is an area where the detection face of the two-dimensional detector 2 can detect X-rays.

An operator can perform an input operation, for example, by operating a mouse so that a cursor 23 on the display screen 22 is placed on an input box displayed on a side of an item to be input on the display screen 22, performing a clicking operation of a mouse to set the input box to a selected state, and then inputting a set value through the input/operation device 24 such as a keyboard. Check boxes are arranged on sides of some items displayed on the display screen 22. The cursor 23 on the display screen 22 is placed on a check box by operating the mouse and clicking the mouse, whereby an item corresponding to the check box can be selected. Note that these are merely examples of the input operation, and the input of a set value and the selection of an item can be performed by an appropriate operation according to a display content on the display screen 22 or the type of the input/operation device 24. The same is applied to a drag operation using the mouse described later.

As described above, the input/operation device 24 such as a mouse, a keyboard, etc. constitutes set value inputting unit for inputting one of the distance L and the detection maximum range Xmax.

Display items include a measurement plane Hp, a maximum measurement frame Hmax, a minimum measurement frame Hmin, and an X-ray detection area A.

The measurement plane Hp is placed to be perpendicular to the optical axis (center axis) of X-rays which are incident from the X-ray source 3a to the sample S. The measurement plane Hp is displayed on the display screen 22 in a state where the measurement plane Hp is viewed from the front side. In other words, the measurement plane Hp on the display screen 22 corresponds to the measurement plane Hp shown in FIGS. 2A and 2B.

The central processing unit 20 calculates the size of the maximum measurement frame Hmax based on the distance L and the detection maximum range Xmax which are set as described above, and the maximum measurement frame Hmax is displayed to be superimposed on a display indicating the measurement plane Hp. Since scatter X-rays, diffracted X-rays or the like as a detection target are scattered or diffracted radially about the optical axis O from the sample S, the maximum measurement frame Hmax is displayed in a circular shape centered on the optical axis O.

The central processing unit 20 calculates the size of the minimum measurement frame Hmin based on the distance L and the detection minimum range Xmin which are set as described above, and the minimum measurement frame Hmin is displayed to be superimposed on the display indicating the measurement plane Hp. The minimum measurement frame Hmin is also displayed in a circular shape centered on the optical axis O.

The X-ray detection area A represents a range in which the two-dimensional detector 2 can detect X-rays incident on the measurement plane Hp. The two-dimensional semiconductor detector used in the present embodiment has a rectangular X-ray detection area A.

The measurement plane Hp is configured so that grids (guide squares) G having the same size and shape as the rectangular X-ray detection area A can be displayed on the measurement plane Hp to be arranged in a grid shape. The grid G is displayed on the measurement plane Hp by selecting the check box of an item of "grid display" indicated on the display screen 22, and it is hidden by clearing the check box. This grid G is useful when the arrangement of the X-ray detection area A is considered as described later.

Since the operator can consider the appropriateness of the setting of the distance L and the detection maximum range Xmax while visually checking the maximum measurement frame Hmax, the minimum measurement frame Hmin and the X-ray detection area A on the display screen 22, it is possible to realize appropriate condition setting in a short time by even an operator who has little experience in operating the X-ray analysis device.

Next, operation items include an item of "frequency of detecting operation" for specifying the frequency of detecting operation, an item of "change measurement range" for changing the measurement range, an item of "interlock with measurement range" for changing the measurement range interlocking with the position of the X-ray detection area A, an item of "divide measurement range" for dividing the measurement range, and an item of "specify measurement range" for arbitrarily specifying the measurement range. The item of the grid display described above is also included in the operation items. In addition, the X-ray analysis assistance device according to the present embodiment has functions of moving the X-ray detection area A to any position on the measurement plane Hp by a drag operation of the mouse, changing the size of the maximum measurement frame Hmax, and displaying a specified measurement range H at any position and in any size.

The display device 21 containing these operation items in the display screen 22 and the input/operation device 24 such as a mouse for executing the drag operation on the display screen 22 constitute display changing unit for outputting an instruction (electrical signal) for changing the content displayed on the display screen 22. The central processing unit 20 controls the display device 21 in accordance with these operation items and an instruction from an operating device to change the content displayed on the display screen 22.

Specifically, the display device 21 and the input/operation device 24 have the following functions as display changing unit. Note that the details of these functions will be described later:

(a) An instruction (electrical signal) for displaying a grid on the display screen 22 is output to the central processing unit 20 (see FIG. 4).

(b) An instruction (electrical signal) for moving the X-ray detection area A displayed on the display screen 22 is output to the central processing unit 20 (see FIG. 5).

(c) An instruction (electrical signal) for displaying plural X-ray detection areas A on the display screen 22 is output to the central processing unit 20 (see FIG. 6).

(d) An instruction (electrical signal) for displaying any number of X-ray detection areas A at any position on the display screen 22 is output to the central processing unit 20 (see FIG. 7).

(e) An instruction (electrical signal) for changing the size of the maximum measurement frame Hmax displayed on the display screen 22 is output to the central processing unit 20 (see FIG. 8).

(f) An instruction (electrical signal) for changing the size of the maximum measurement frame Hmax in accordance with the outer edge of the X-ray detection area A displayed on the display screen 22 is output to the central processing unit 20 (see FIG. 9).

(g) An instruction (electrical signal) for dividing a measurement area within the maximum measurement frame Hmax displayed on the display screen 22 and displaying a part of the divided measurement area is output to the central processing unit 20 (see FIG. 10).

(h) An instruction (electrical signal) for displaying a specified measurement range H having any size and any shape at any position on the display screen 22 is output to the central processing unit 20 (see FIG. 14).

FIGS. 5 to 16 are diagrams showing an operation of changing the display content on the display screen.

For example, as shown in FIG. 5, the X-ray detection area A displayed on the display screen 22 can be moved to any position within the measurement plane Hp. An operation of moving the X-ray detection area A can be performed by a so-called drag operation in which the cursor 23 is placed on the X-ray detection area A by operating the mouse and then moved while clicking the mouse. Upon this operation, an instruction of moving the X-ray detection area A is output to the central processing unit 20, and the central processing unit 20 controls the display device 21 according to the instruction to move the X-ray detection area A displayed on the display screen 22.

By moving the X-ray detection area A on the display screen 22 to any position as described above, the operator can consider, for example, an optimal position of the X-ray detection area A for the measurement area within the maximum measurement frame Hmax.

Note that the central processing unit 20 calculates a movement position (X-Z coordinate value) of the moving stage 11 for moving the two-dimensional detector 2 in an X-Z direction based on the position of the X-ray detection area A displayed on the display screen 22.

As shown in FIG. 6, plural X-ray detection areas A can be also displayed on the display screen 22. The display may be changed to a display as described above by placing the cursor 23 on the display screen 22 at an input box displayed on a side of the item of "frequency of detecting operation" for specifying the frequency of detecting operation in the operation items by operating the mouse, setting the input box to a selected state by a click operation, and then inputting a numerical value ("3" in the figure) indicating the number of X-ray detection areas A by the input/operation device 24 such as a keyboard. Through this operation, an instruction for displaying the specified number of X-ray detection areas A is output to the central processing unit 20, and the central processing unit 20 controls the display device 21 according to the instruction to display the specified number of X-ray detection areas A on the display screen 22. The detection of the X-rays by the two-dimensional detector 2 is performed at the position of each X-ray detection area A displayed on the display screen 22. Therefore, in FIG. 6, the item of "frequency of detecting operation" is set to specify the frequency of the detecting operation. It is needless to say that the corresponding operation item may be an item for specifying the number of X-ray detection areas A.

As described above, by displaying the plural X-ray detection areas A on the display screen 22, the operator can consider, for example, an optimum X-ray detection area for an area within the maximum measurement frame Hmax.

In addition, as shown in FIG. 7, any number of X-ray detection areas A can be displayed at any position on the display screen 22. In order to change the display as described above, the number of X-ray detection areas A to be displayed is first input into an input box on a side of the item of "frequency of detecting operation" for specifying the frequency of the detecting operation in the operation items in the manner described above with reference to FIG. 6 to display a required number of X-ray detection areas A on the display screen 22. Next, each of the X-ray detection areas A is moved to any position by the drag operation using the mouse. By this operation, an instruction for displaying each of the specified number of X-ray detection areas A to a specified position is output to the central processing unit 20, and the central processing unit 20 controls the display device 21 in accordance with the instruction to display the specified number of X-ray detection areas A at specified positions on the display screen 22.

By displaying any number of X-ray detection areas A at any positions on the display screen 22 as described above, the operator can set the measurement conditions so that X-rays incident within the maximum measurement frame Hmax can be appropriately and efficiently detected by the two-dimensional detector.

As shown in FIG. 8, the size of the maximum measurement frame Hmax can be changed. In order to change the display as described above, a check box provided on a side of the item of "change measurement range" for instructing change of the measurement range in the operation items is first checked. Subsequently, the mouse is operated to place the cursor 23 on a circle representing the maximum measurement frame Hmax, and then the mouse is dragged while clicking the mouse, whereby the change of the display can be performed. By this operation, an instruction for changing the size of the maximum measurement frame Hmax is output to the central processing unit 20, and the central processing unit 20 controls the display device 21 in accordance with the instruction to change the size of the maximum measurement frame Hmax displayed on the display screen 22.

For example, as shown in FIG. 8, by matching the maximum measurement frame Hmax with the outer edge of the X-ray detection area A, almost all X-rays which are incident to the area within the maximum measurement frame Hmax and required as measurement data can be detected by one detecting operation using the two-dimensional detector 2.

Here, the central processing unit 20 serves as the automatic setting unit to automatically reset one of the distance L and the detection maximum range Xmax based on the changed maximum measurement frame Hmax. An item of "fixed item" for selecting an item in which a set value is desired to be fixed is displayed on the display screen 22 while contained in the setting items, and by checking any one of check boxes on sides of "Xmax" and "L" indicated in this "fixed item", the set value of the corresponding setting item is fixed, and the set value of the other setting item is reset based on the maximum measurement frame Hmax.

As shown in FIG. 9, the maximum measurement frame Hmax can be automatically changed in accordance with the outer edge of the X-ray detection area A. In order to change the display as described above, a check box provided on a side of the item of "interlock with measurement range" in which the measurement range is changed interlockingly with the position of the X-ray detection area A in the operation items is first checked. By this operation, an instruction for automatically changing the maximum measurement frame Hmax according to the outer edge of the X-ray detection area A is output to the central processing unit 20, and the central processing unit 20 controls the display device 21 according to the instruction to change the maximum measurement frame Hmax displayed on the display screen 22 in accordance with the outer edge of the X-ray detection area A.

By automatically changing the maximum measurement frame Hmax in accordance with the outer edge of the X-ray detection area A as described above, the operator can settle, for example, the size of the optimum maximum measurement frame Hmax for the X-ray detection area A.

At this time, the central processing unit 20 serves as the automatic setting unit to automatically reset one of the distance L and the detection maximum range Xmax based on the changed maximum measurement frame Hmax. An item to be reset is an item for which the check box provided in the fixed item on the display screen 22 is not checked.

As shown in FIG. 10, it is also possible to divide the measurement area in the maximum measurement frame Hmax and display a part thereof. In order to change the display as described above, a check box provided in the item of "divide measurement range" for dividing the measurement range in the operation items is first checked, and a check box indicating the division size is selected to check any desired check box. When it is desired to display divided pieces of the measurement area within the maximum measurement frame Hmax at symmetrical positions about the optical axis O, a check box of "symmetric division" is also checked. Through this operation, an instruction for dividing the measurement area within the maximum measurement frame Hmax and display a part thereof is output to the central processing unit 20, and the central processing unit 20 controls the display device 21 according to the instruction to divide the measurement area within the maximum measurement frame Hmax displayed on the display screen 22 and display a part thereof. For example, in FIG. 10, divided pieces of the measurement area within the maximum measurement frame Hmax are displayed with a quarter size and at symmetrical positions.

The divided pieces of the measurement area within the maximum measurement frame Hmax displayed on the display screen 22 can be rotated about the optical axis O and arranged at any angular positions by placing the cursor 23 at the divided pieces and dragging the mouse.

When the divided pieces of the measurement area within the maximum measurement frame Hmax are displayed on the display screen 22, as shown in FIG. 11, the central processing unit 20 serves as the automatic setting unit to automatically set the number and arrangement of one or a plurality of X-ray detection areas A so as to cover the divided pieces of the measurement area within the displayed maximum measurement frame Hmax. Then, the one or the plurality of the set X-ray detection areas A are displayed on the display screen 22. As a result, the operator can set measurement conditions while visually checking the divided pieces of the measurement area within the maximum measurement frame Hmax and the one or the plurality of the X-ray detection areas A so that X-rays from the sample S can be appropriately and efficiently detected by the two-dimensional detector 2, for example.

Figure 12:
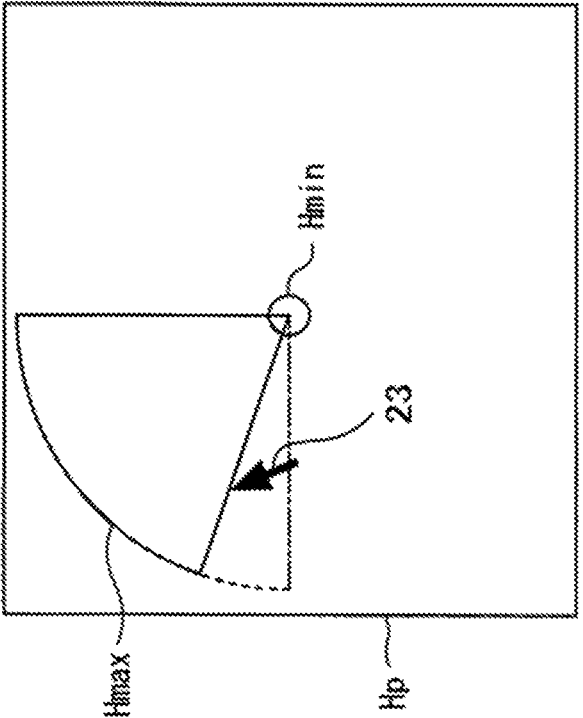
FIG. 12 is a diagram showing still another example of the display screen in which the display content is changed.

In the present embodiment, the item of "divide measurement range" for dividing the measurement range is provided with a check box for selecting division at "arbitrary" size. As shown in FIG. 12, a check box for a standard size is checked, and the check box for selecting "arbitrary" is checked, whereby a divided piece is displayed in the measurement area within the maximum measurement frame Hmax having the selected size on the display screen 22. The size of the divided piece can be arbitrarily changed by placing the cursor 23 on this divided piece and dragging the mouse.

Figure 13C:
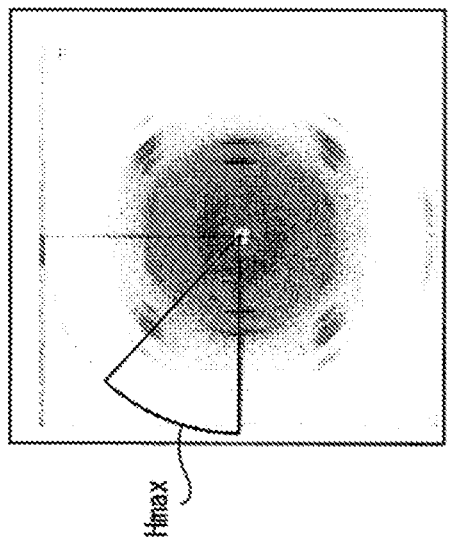
FIGS. 13A to 13E are diagrams showing various examples in which a measurement region within a maximum measurement frame Hmax is divided for X-rays scattered or diffracted by a sample, and only X-rays entering divided regions are set as detection targets.
Figure 13B:
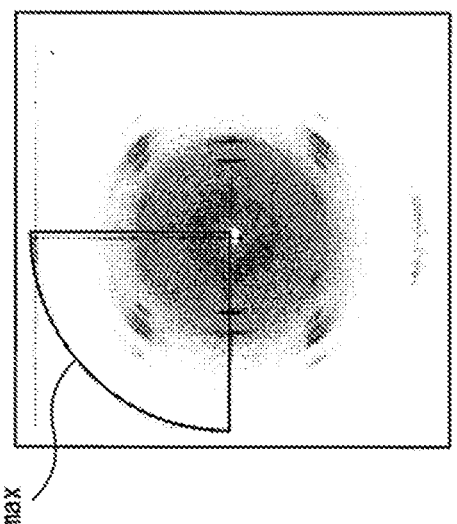
Figure 13A:
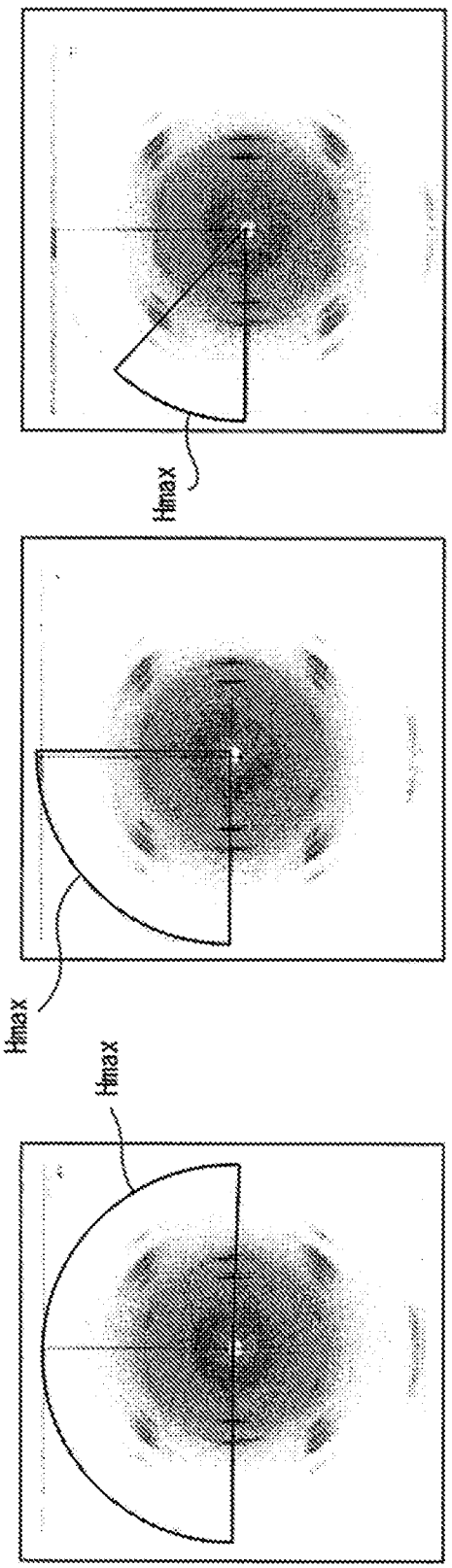
Figure 13E:
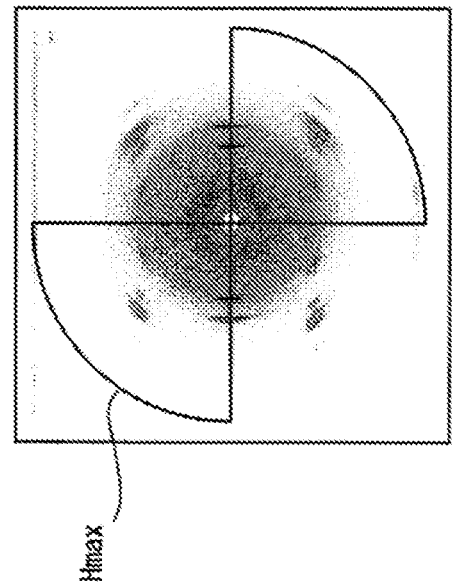
Figure 13D:
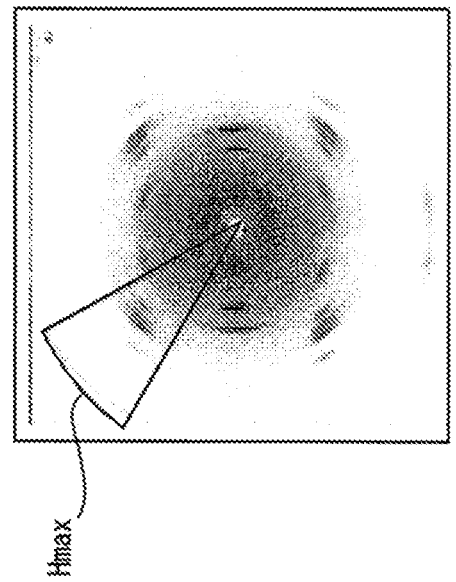

FIGS. 13A to 13E show various examples in which the measurement area within the maximum measurement frame Hmax is divided for X-rays scattered or diffracted by the sample S and only X-rays entering the division area are detected as a detection target. In other words, FIG. 13A shows that the measurement area within the maximum measurement frame Hmax is divided into a ½-size piece, and X-rays incident to the divided piece are detected as a detection target. FIG. 13B shows that the measurement area within the maximum measurement frame Hmax is divided into a ¼-size piece and X-rays incident to the divided piece are detected as a detection target. FIG. 13C shows that the measurement area within the maximum measurement frame Hmax is divided into a ⅛-size piece and X-rays incident to the divided piece are detected as a detection target. FIG. 13D shows that the measurement area within the maximum measurement frame Hmax is divided into an arbitrary-size piece and X-rays incident to the divided piece are detected as a detection target. FIG. 14E shows that the measurement area within the maximum measurement frame Hmax is divided into ¼-size pieces, the divided pieces are arranged at symmetrical positions and X-rays incident to the divided pieces are detected as a detection target.

For example, in the case of a sample S having isotropy, symmetric scattering around the optical axis O occurs, so that the measurement time can be shortened by setting only a part as shown in FIGS. 13A to 13C as a measurement range and assuming that scatter X-rays are likewise incident at symmetric positions.

As shown in FIG. 14, a specified measurement range H having any size and any shape can be displayed at any position on the display screen 22. In order to change the display as described above, a check box provided on a side of an item of "specify measurement range" for arbitrarily specifying the measurement range in the operation items is checked. Next, the cursor 23 is placed at any position within the measurement plane Hp, and the drag operation using the mouse is performed with the position set as a starting point, thereby specifying a measurement range with any size. The measurement range specified on the display screen 22 in this manner is referred to as a specified measurement range H. Through this operation, an instruction for displaying the specified measurement range H having any size and any shape at any position on the display screen 22 is output to the central processing unit 20, and the central processing unit 20 controls the display device 21 according to the instruction to display the specified measurement range H having the specified size and the specified shape at the specified position on the display screen 22.

Figure 15:
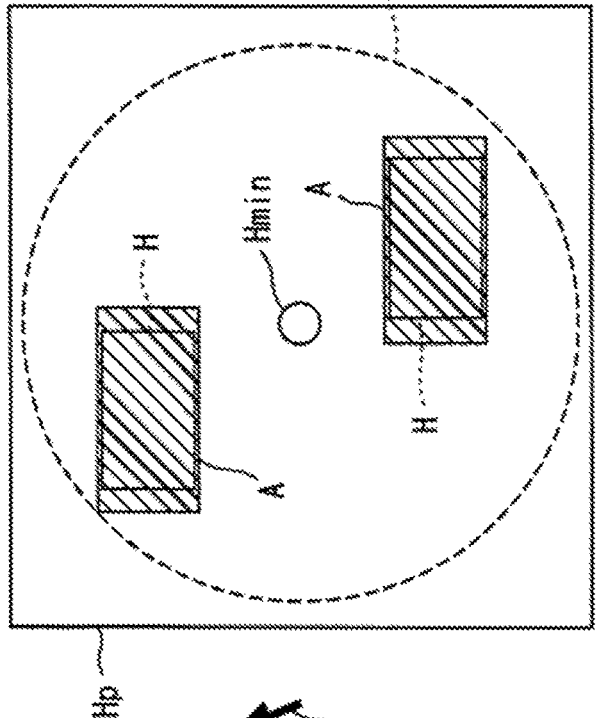
FIG. 15 is a diagram showing an example of the display screen in which the display content is changed subsequently to the display screen in FIG. 14.

When the specified measurement range H is displayed on the display screen 22, as shown in FIG. 15, the central processing unit 20 serves as the automatic setting unit to automatically set X-ray detection areas A so that a number and an arrangement of the X-ray detection areas A cover the specified measurement range H. Then, the set X-ray detection areas A are displayed on the display screen 22. As a result, the operator can set measurement conditions while visually checking the specified measurement range H and the X-ray detection areas A so that X-rays scattered or diffracted by the sample S can be appropriately and efficiently detected by the two-dimensional detector 2, for example.

As shown in FIG. 16, it is also possible to read existing measurement data containing X-ray information detected by the two-dimensional detector 2 and display the X-ray information contained in the measurement data on the display screen 22.

The display screen 22 is provided with an item of "read measurement data" for reading existing measurement data. This item of "read measurement data" contains a file input field 22a and a reading button 22b. A save destination for a file in which the measurement data are recorded is specified in the file input field 22a, and the reading button 22b is clicked by the mouse. By this operation, an instruction for reading out the measurement data recorded in the specified file is output to the central processing unit 20. According to the instruction, the central processing unit 20 reads out the file having the measurement data recorded therein from the specified save destination, and displays the X-ray information 22c contained in the measurement data on the display screen 22.

The display device 21 containing the item of "read measurement data" on the display screen 22, the input/operation device 24 such as a mouse or a keyboard for operating the item of "read measurement data", and the central processing unit 20 for controlling these devices constitute data reading unit for reading existing measurement data containing X-ray information.

As described above, the existing measurement data are read, and X-ray information 22c contained in the measurement data is displayed on the display screen 22, whereby the operator can visually consider setting of measurement conditions while referring to the X-ray information 22c displayed on the display screen 22. The X-ray information 22c includes image information in which peaks of X-rays scattered or diffracted by the sample S are recorded, etc.

The following application examples can be developed from the embodiment of the configuration for reading existing measurement data.

Figure 17:
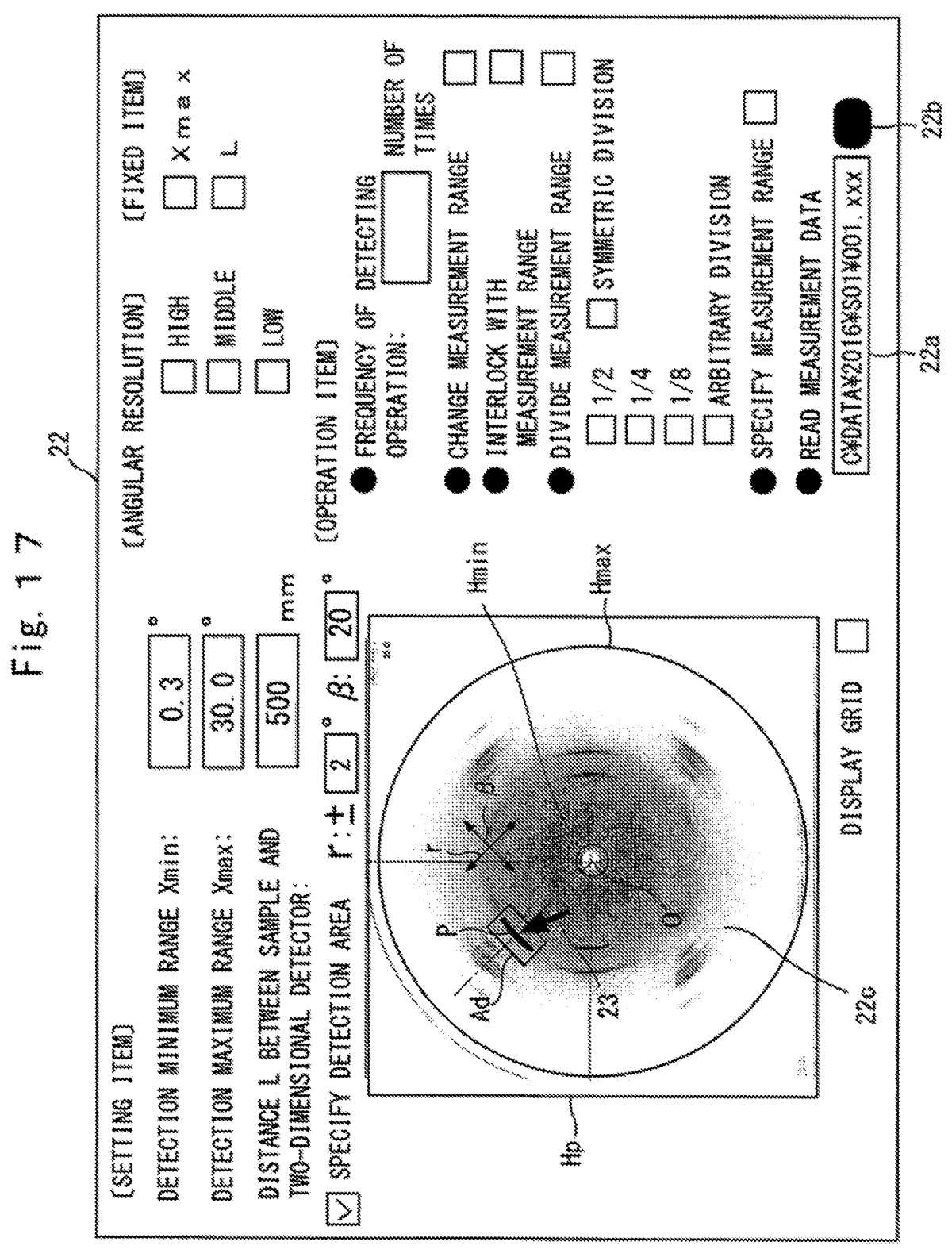

In other words, as shown in FIG. 17, a file in which measurement data are recorded is read, and X-ray information 22c contained in the measurement data is displayed on the display screen 22. The operation for displaying the X-ray information 22c on the display screen 22 is performed in the manner as described above with reference to FIG. 16.

At this time, the central processing unit 20 displays, on the corresponding setting items of the display screen 22, measurement conditions (distance L, maximum detection range Xmax, detection minimum range Xmin) contained in the read measurement data at the time when the measurement data contained in the read measurement data are read.

In the application example shown in FIG. 17, an item of "specify detection area" is added to the setting items of the display screen 22. The item of "specify detection area" is an item for specifying a detection area where the operator wishes to detect X-rays. In the application example shown in the figure, the item of "specify detection area" is provided with a check box for selecting setting based on the same item and an input box for specifying, with a numerical value, the size of the area where X-ray detection is desired to be performed.

An angular range in a radial direction r centered on the optical axis O where scatter X-rays or diffracted X-rays from the sample S spread and a range in a width direction β perpendicular to the angular range are input into input boxes of the item "specify detection area" with numerical values. Specifically, the check box of the item of "specify detection area" is checked, and the respective ranges of the radial direction r and the width direction β are input into the input boxes with numerical values by using the input/operation device 24 such as a keyboard. The angular range in the radial direction r may be set, for example, by inputting a numerical value of a vector Q or 2θ angle. Furthermore, the range in the width direction β is specified by an arc-like angular range centered on the optical axis O, but this is approximated and displayed with a straight line on the display screen 22 of FIG. 17, etc. However, it is a matter of course that a method of specifying the range is not limited to this method, and it can be designed arbitrarily.

Furthermore, with respect to the X-ray information 22c displayed on the display screen 22, the cursor 23 on the display screen 22 is operated by using the input/operation device 24 such as a mouse to be placed on the center point of an area where X-rays are desired to be detected, and the position of the area is specified by the clicking operation of the mouse or the like.

In response to these operations, the central processing unit 20 displays, on the display screen 22, a specified detection area Ad of a range which is specified with a numerical value inputted in the check box and centered on the position specified by the cursor 23 (see FIG. 17).

For example, it is possible to easily perform an operation of paying attention to one of peak positions P of the scatter X-rays or diffracted X-rays represented by the X-ray information 22c and specifying an area containing the peak position P as the specified detection area Ad or the like.

Figure 18:
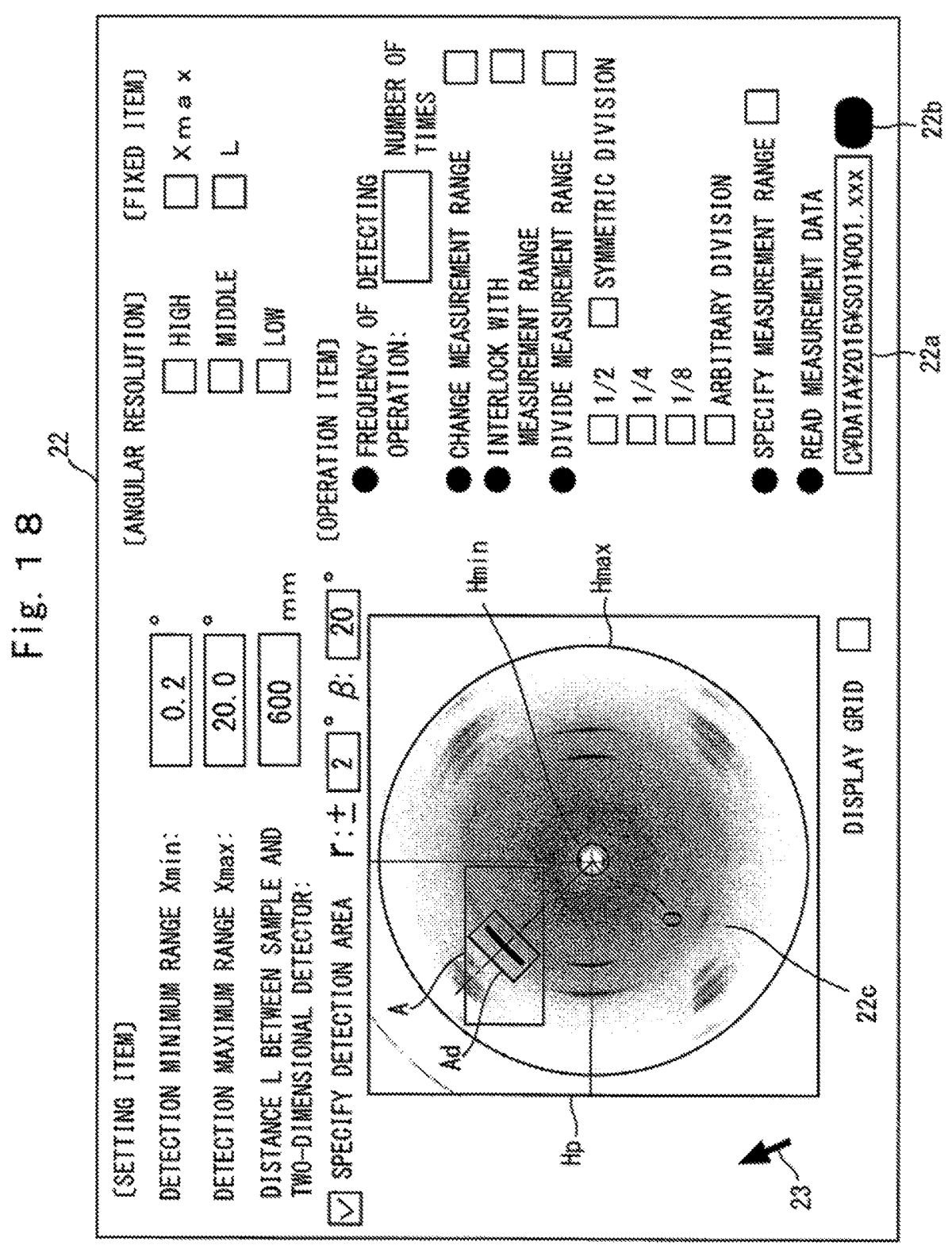

When the specified detection area Ad is displayed on the display screen 22, the central processing unit 20 places the X-ray detection area A on the display screen 22 so that the X-ray detection area A surrounds the specified detection area Ad as shown in FIG. 18. Here, the size of the X-ray detection area A is constant on the measurement plane Hp. In this application example, the specified detection area Ad is enlarged or reduced with respect to the X-ray detection area A, whereby the specified detection area Ad is adjusted to be contained in the X-ray detection area A in contact with the X-ray detection area A.

At this time, the distance L between the sample S and the two-dimensional detector 2 is also changed in connection with the enlargement or reduction of the specified detection area Ad on the measurement plane Hp. In other words, when the distance L is shorter, the detection maximum range Xmax is larger (for example, L=L3 and Xmax-3 in FIG. 2A), so that the specified detection area Ad is reduced and displayed on the measurement plane Hp. On the other hand, when the distance L is longer, the detection maximum range Xmax is smaller (for example, L=L1 and Xmax-1 in FIG. 2A), so that the specified detection area Ad is enlarged and displayed on the measurement plane Hp.

As described above, there is a correlation between the size of the specified detection area Ad and the value of the distance L, and thus in the present application example, the specified detection area Ad displayed on the display screen 22 becomes "a value corresponding to the distance L". The display device 21 including the display screen 22 containing, on the display screen 22, the item of "specify detection area" used to specify the specified detection area Ad and the input/operation device 24 such as a mouse constitute set value inputting unit for inputting the value corresponding to the distance L.

Along with the operation of changing the size of the specified detection area Ad in accordance with the X-ray detection area A, the distance L is set, and the detection maximum range Xmax and the detection minimum range Xmin are also set in connection with the distance L. The distance L, the detection maximum range Xmax and the detection minimum range Xmin are displayed on the display screen 22.

Note that the application example shown in FIG. 18 is configured so that an image of the X-ray information 22c displayed on the display screen 22 is also enlarged or reduced around the optical axis O in accordance with the change of the distance L. However, the image of the X-ray information 22c may be erased from the display screen 22 in accordance with a timing of enlarging or reducing the specified detection area Ad on the display screen 22.

For example, the operator can set the measurement conditions (the distance L, the detection maximum range Xmax, etc.) so that X-rays scattered or diffracted by the sample S can be appropriately and efficiently detected by the two-dimensional detector 2 while visually checking the specified detection area Ad and the X-ray detection area A.

When the values of the distance L, the detection maximum range Xmax, the detection minimum range Xmin, etc. displayed on the setting items of the display screen 22 are changed by the operator, which causes the specified detection area Ad to be enlarged and protrudes from the X-ray detection area A as shown in FIG. 19, the central processing unit 20 automatically sets the number and arrangement of the X-ray detection areas A so as to cover the specified detection area Ad. The set X-ray detection areas A can be also displayed on the display screen 22.

Figure 20:
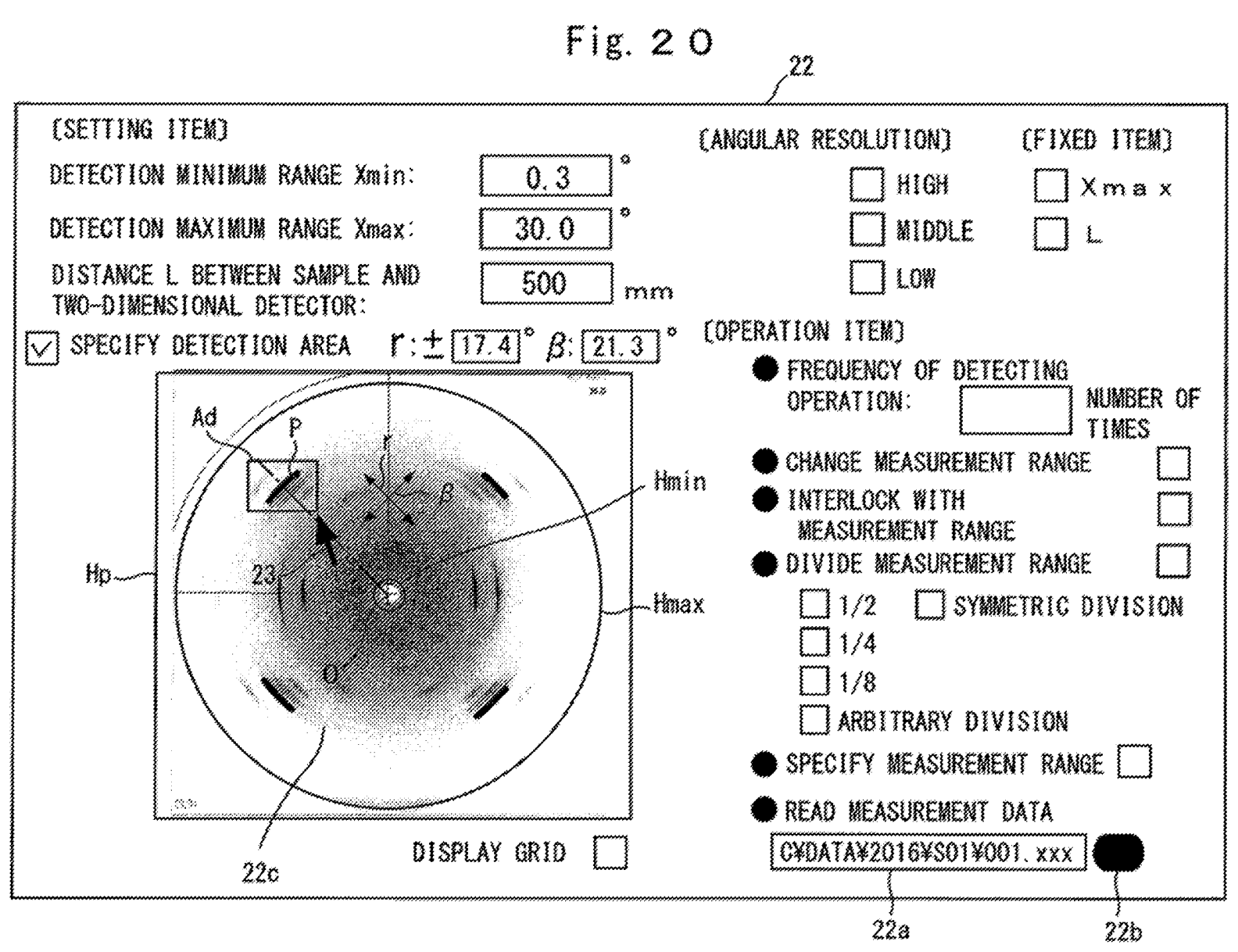

As shown in FIG. 20, it is also possible to operate the cursor 23 on the display screen 22 by using the input/operation device 24 such as a mouse to specify a range for an area where X-rays are desired to be detected by moving the cursor 23 with respect to the X-ray information 22c displayed on the display screen 22. In this configuration, the input/operation device 24 such as a mouse constitutes set value inputting unit for inputting the value corresponding to the distance L (the size and position of the specified detection area Ad).

There may be added a function of rotating the specified detection area Ad about the optical axis O and arranging a rectangle indicating the specified detection area Ad horizontally when the rectangle indicating the specified detection area Ad is placed to be inclined with respect to horizontal and vertical directions on the display screen 22 as shown in FIG. 17.

Figure 21:
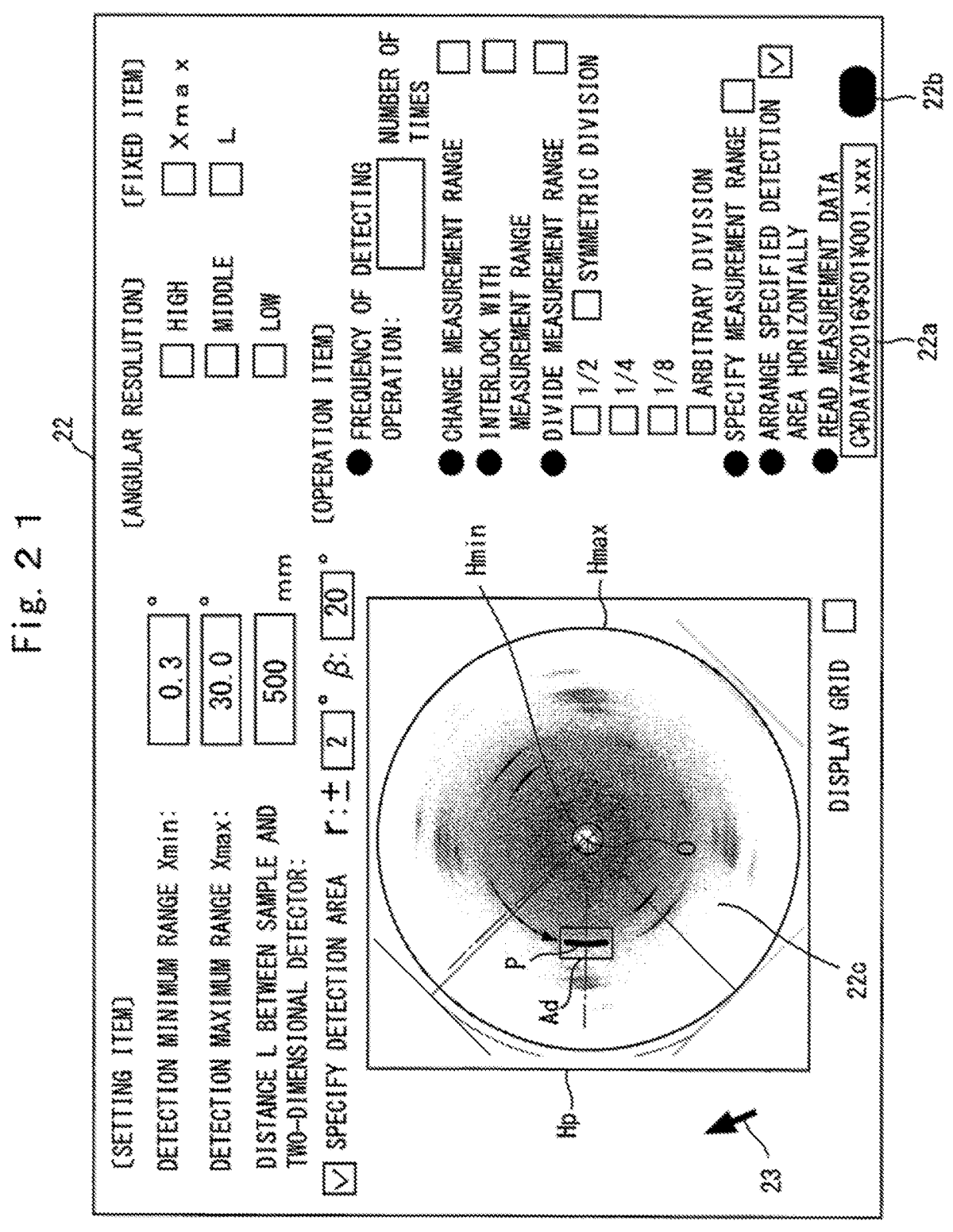

For example, as shown in FIG. 21, an item of "arrange specified detection area horizontally" for arranging the specified detection area Ad is provided in the operation item of the display screen 22, and when a check box for this item is checked, the central processing unit 20 calculates the inclination angle of the specified detection area Ad with respect to the horizontal axis, rotates the specified detection area Ad around the optical axis O based on the calculation result, and arranges the specified detection area Ad in a horizontal position.

By rotating the sample mounted on the X-ray analysis device in plane in accordance with the angle by which the specified detection area Ad is rotated, the direction of the X-rays scattered or diffracted from the sample can be matched with the state of the display screen 22 in which the specified detection area Ad is arranged horizontally.

The respective set values of the distance L between the sample S and the two-dimensional detector 2, the detection maximum range Xmax of X-rays scattered or diffracted by the sample S, the detection minimum range Xmin of X-rays scattered or diffracted by the sample S, and information on the number of X-ray detection areas A (the frequency of detecting operation) and the positions of the X-ray detection areas A (moving positions of the moving stage 11: X-Z coordinate values) which are determined based on the operations and considerations as described above may be printed on a sheet as shown in FIG. 22 by using an output device 26 such as a printer connected to the central processing unit 20 after the operations are completed, and referred to when an analysis condition in the small-angle X-ray scattering measurement apparatus (X-ray analysis device) is set. Furthermore, such information may be displayed on the display screen 22 after the operations are finished. Still furthermore, such information may be recorded in a setting file and stored in a storage device after the operations are finished.

Note that the present invention is not limited to the embodiment described above. In other words, the abovementioned embodiment is only one configuration example embodying the present invention. Therefore, for example, the layout and display items of the display screen 22 of the display device 21, and further the content of the display change are not limited to those shown in FIGS. 4 to 21 (excluding FIGS. 13A to 13E), and may be appropriately changed in design.

The X-ray analysis assistance device of the present invention is not limitedly applied to the small-angle X-ray scattering measurement apparatus, but may be applied to various types of X-ray analysis devices (for example, X-ray powder diffraction apparatus) including the distance L between the sample S and the two-dimensional detector 2 and the detection maximum range Xmax of X-rays scattered or diffracted by the sample S as the setting items of the measurement conditions.

Furthermore, the X-ray analysis assistance device of the present invention may be incorporated into an X-ray analysis device, thereby configuring an X-ray analysis device having an assistance function when measurement conditions are set. In that case, the values of the setting items set by the X-ray analysis assistance device may be output to the control unit of the X-ray analysis device.

While the above description constitutes the preferred embodiment of the present invention, it will be appreciated that the invention is susceptible to modification, variation and change without departing from the proper scope and fair meaning of the accompanying claims.

The invention claimed is:

1. An X-ray analysis assistance device for an X-ray analysis device for detecting X-rays scattered or diffracted by a sample by a two-dimensional detector when X-rays from an X-ray source are incident to the sample and is used to set measurement conditions of the X-ray analysis device, comprising, wherein a distance L between the sample and the two-dimensional detector, and a detection maximum range Xmax that is desired to be acquired as measurement data of the X-rays scattered or diffracted by the sample are setting items; an X-ray detection area A representing a range in which a detection face of the two-dimensional detector can detect X-rays, and a maximum measurement frame Hmax representing a boundary on a wide-angle side where X-rays in the detection maximum range Xmax are incident to a measurement plane containing the detection face of the two-dimensional detector are display items; and the X-ray analysis assistance device further comprises:
a set value inputting unit adapted to input one of values corresponding to the distance L and the detection maximum range Xmax,
an automatic setting unit adapted to automatically set one of the setting items based on the value corresponding to the other of the setting items input by the set value inputting unit; and
a display unit adapted to display the maximum measurement frame Hmax on a display screen based on the distance L and the detection maximum range Xmax and display the X-ray detection area A on the display screen.

2. The X-ray analysis assistance device according to claim 1 further comprising, wherein a detection minimum range Xmin that is desired to be acquired as measurement data of the X-rays scattered or diffracted by the sample is the setting item; a minimum measurement frame Hmin representing a boundary on a low-angle side where X-rays in the detection minimum range Xmin are incident to the measurement plane is the display item, the set value inputting unit has a function of inputting and setting one of the distance L and the detection minimum range Xmin; and the display unit has a function of displaying the minimum measurement frame Hmin on the display screen based on the distance L and the detection minimum range Xmin.

3. The X-ray analysis assistance device according to claim 1, further comprising, a display changing unit adapted to issue an instruction for changing contents displayed on the display screen.

4. The X-ray analysis assistance device according to claim 3 further comprising, wherein the display changing unit issues a further instruction for displaying a grid on the display screen, and the display unit has a function of displaying the grid having squares each having the same size and shape as the X-ray detection area A on the display screen based on the further instruction.

5. The X-ray analysis assistance device according to claim 3 further comprising, wherein the display changing unit issues a further instruction for moving the X-ray detection area A displayed on the display screen, and the display unit has a function of moving the X-ray detection area A within the display screen based on the further instruction.

6. The X-ray analysis assistance device according to claim 3 further comprising, wherein the display changing unit issues a further instruction for displaying a plurality of the X-ray detection areas A on the display screen, and the display unit has a function of displaying the plurality of X-ray detection areas A on the display screen based on the further instruction.

7. The X-ray analysis assistance device according to claim 3 further comprising, wherein the display changing unit issues a further instruction for displaying any number of X-ray detection areas A at any position on the display screen, and the display unit has a function of displaying any number of X-ray detection areas A at any position on the display screen based on the further instruction.

8. The X-ray analysis assistance device according to claim 3 further comprising, wherein the display changing unit issues a further instruction for changing a size of the maximum measurement frame Hmax displayed on the display screen, the display unit has a function of changing the size of the maximum measurement frame Hmax displayed on the display screen based on the further instruction, and the automatic setting unit has a function of automatically setting the distance L or the detection maximum range Xmax based on the changed maximum measurement frame Hmax.

9. The X-ray analysis assistance device according to claim 3, further comprising, wherein the display changing unit issues a further instruction for changing the size of the maximum measurement frame Hmax in accordance with an outer edge of the X-ray detection area A displayed on the display screen, the display unit has a function of changing the size of the maximum measurement frame Hmax in accordance with the outer edge of the X-ray detection area A displayed on the display screen based on the further instruction, and the automatic setting unit has a function of automatically setting the distance L or the detection maximum range Xmax based on the changed maximum measurement frame Hmax.

10. The X-ray analysis assistance device according to claim 3 further comprising, wherein the display changing unit issues a further instruction for dividing a measurement area within the maximum measurement frame Hmax displayed on the display screen and displaying a part of the divided measurement area, and the display unit has a function of dividing the measurement area within the maximum measurement frame Hmax displayed on the display screen and displaying a part of the divided measurement area based on the further instruction.

11. The X-ray analysis assistance device according to claim 10 further comprising, wherein the automatic setting unit has a function of automatically setting a number and an arrangement of one or a plurality of the X-ray detection areas A so as to cover the measurement area within the maximum measurement frame Hmax, the measurement area being divided into parts, and some of the parts being displayed, and the display unit has a function of displaying the automatically set number and arrangement of the one or the plurality of the X-ray detection areas A on the display screen.

12. The X-ray analysis assistance device according to claim 3 further comprising, wherein the display changing unit issues a further instruction for displaying a specified measurement range H having any size and any shape at any position on the display screen, the display unit has a function of displaying a specified measurement range H having any size and any shape at any position on the display screen based on the further instruction, the automatic setting unit has a function of automatically setting the number and arrangement of one or a plurality of the X-ray detection areas A so as to cover the specified measurement range H displayed on the display screen, and the display unit has a function of displaying the automatically set number of the one or the plurality of the X-ray detection areas A in the automatically set arrangement on the display screen.

13. The X-ray analysis assistance device according to claim 1 further comprising, a data reading unit for reading existing measurement data containing X-ray information detected by the two-dimensional detector, and wherein the display unit has a function of displaying, on the display screen, X-ray information contained in the measurement data read by the data reading unit.

14. The X-ray analysis assistance device according to claim 1 further comprising, wherein the X-ray analysis device is a small-angle X-ray scattering measurement apparatus using a two-dimensional semiconductor detector as the two-dimensional detector, and the detection maximum range Xmax is set based on a scattering or diffraction vector Q of X-rays scattered or diffracted by the sample, a scattering or diffraction angle 2θ of X-rays scattered or diffracted by the sample with respect to an optical axis of X-rays incident to the sample or a size d in a structure of the sample.

15. An X-ray analysis device comprising, the X-ray analysis assistance device according to claim 1, the X-ray source for making X-rays incident to the sample, and the two-dimensional detector for detecting X-rays scattered or diffracted by the sample.

16. An X-ray analysis device comprising, the X-ray analysis assistance device according to claim 2, the X-ray source for making X-rays incident to a sample, and the two-dimensional detector for detecting X-rays scattered or diffracted by the sample.

17. An X-ray analysis device comprising, the X-ray analysis assistance device according to claim 3, the X-ray source for making X-rays incident to the sample, and the two-dimensional detector for detecting X-rays scattered or diffracted by the sample.

* * * * *